United States Patent [19]

Yagi et al.

[11] Patent Number: 5,801,907
[45] Date of Patent: Sep. 1, 1998

[54] MAGNETIC DISK DRIVE WITH AUTOMATIC ACTUATOR AND LOCKING STRUCTURE

[75] Inventors: Norio Yagi; Kunihiro Shimada; Takehiko Katoh; Kenichi Myokan; Takashi Matsumoto; Kazuhiko Takaishi, all of Kawasaki, Japan

[73] Assignee: Fujitsu Limited, Kawasaki, Japan

[21] Appl. No.: 791,626

[22] Filed: Jan. 31, 1997

Related U.S. Application Data

[63] Continuation of Ser. No. 317,034, Oct. 3, 1994, abandoned.

[30] Foreign Application Priority Data

Dec. 17, 1993 [JP] Japan ................................ 5-343979

[51] Int. Cl.$^6$ ............................. G11B 5/54; G11B 21/22
[52] U.S. Cl. ........................................................ 360/105
[58] Field of Search .............................. 360/97.01, 98.01, 360/104, 105, 106

[56] References Cited

U.S. PATENT DOCUMENTS

| | | | |
|---|---|---|---|
| 4,756,341 | 7/1988 | Takehana | 139/435 |
| 5,023,736 | 6/1991 | Kelsic | 360/105 |
| 5,034,837 | 7/1991 | Schmitz | 360/105 |
| 5,170,300 | 12/1992 | Stefansky | 360/105 |
| 5,315,455 | 5/1994 | Ito | 360/75 |
| 5,448,435 | 9/1995 | Nakazawa et al. | 360/105 |

FOREIGN PATENT DOCUMENTS

| | | |
|---|---|---|
| 52-104212 | 9/1977 | Japan . |
| 57-6470 | 1/1982 | Japan . |
| 61-59676 | 3/1986 | Japan . |
| 62-177773 | 8/1987 | Japan . |
| 62-245579 | 10/1987 | Japan . |
| 63-96781 | 4/1988 | Japan . |
| 1211284 | 8/1989 | Japan . |
| 2232875 | 9/1990 | Japan . |
| 3141085 | 6/1991 | Japan . |
| 3214476 | 9/1991 | Japan . |
| 4 67477 | 3/1992 | Japan . |
| 4301278 | 10/1992 | Japan . |
| 9319460 | 9/1993 | WIPO . |

OTHER PUBLICATIONS

PCT Publication No. WO 93/10535 published May 27, 1993, Abstract only.

*Primary Examiner*—Stuart S. Levy
*Assistant Examiner*—William J. Klimowicz
*Attorney, Agent, or Firm*—Greer, Burns & Crain, Ltd.

[57] ABSTRACT

A magnetic disk drive for locking an actuator mounted with a magnetic head in a safety zone. The magnetic disk drive comprises a magnet, fixed yoke members and a stopper for setting a stop position of rotations of the rotary actuator in such a position that torque by the fixed yoke members and the magnet is maximized. The fixed yoke members form a magnetic circuit for the magnet in all or a part of a movable range of the rotary actuator. The fixed yoke members include a first area having a gap width uniformly reduced in a lock direction to retract the rotary actuator and a second area having a gap width smaller than a gap width of the first area. The fixed yoke members are mechanically separated from each other. The fixed yoke members further include a second area having a minimum gap width to lock the rotary actuator, a first area having such a gap that a gap width becomes smaller as it approaches the second area and a third area formed between the second area and the first area and having a gap width larger than a gap width of the second area.

37 Claims, 26 Drawing Sheets

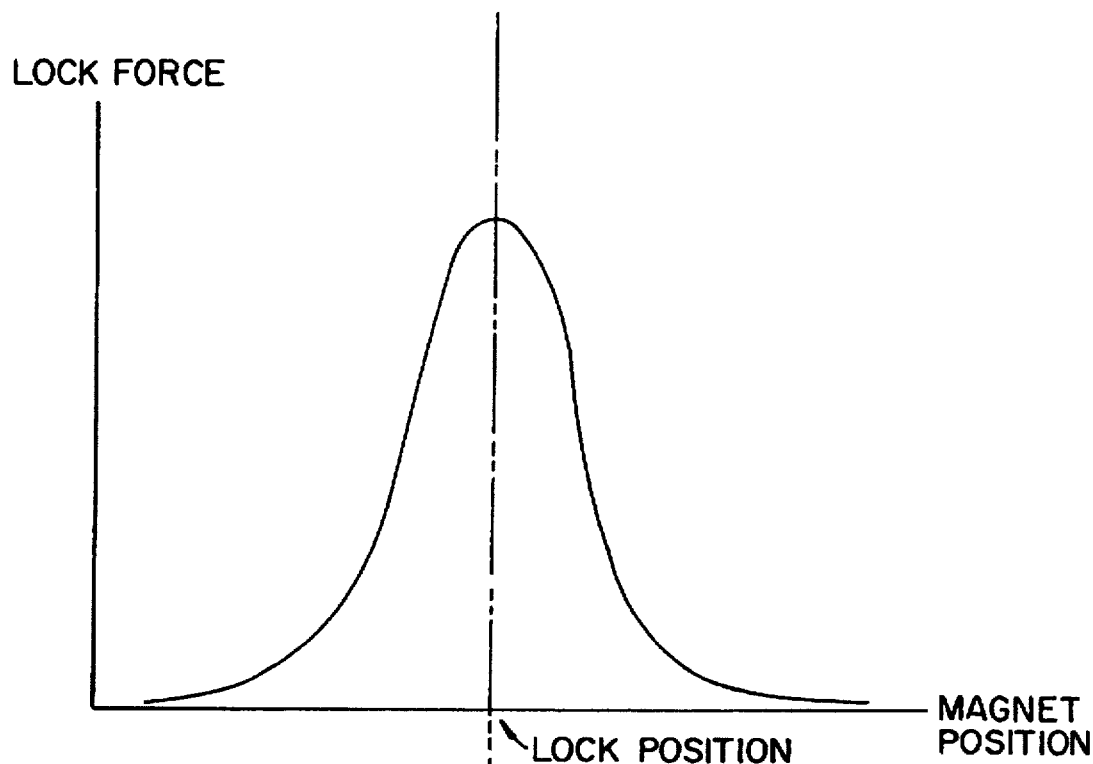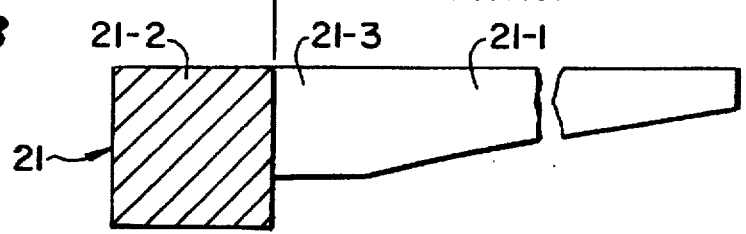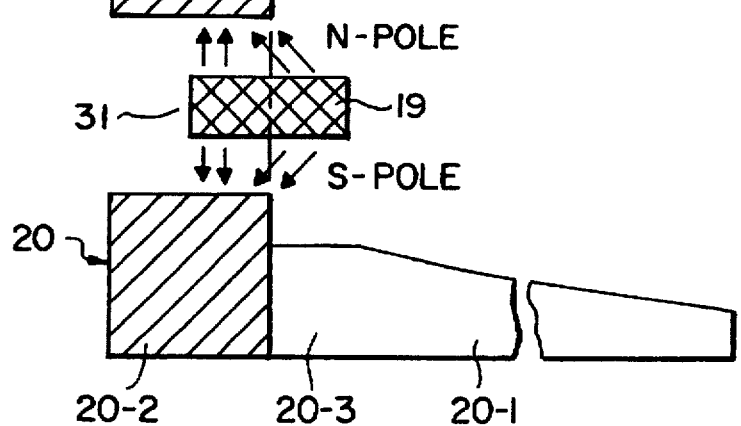

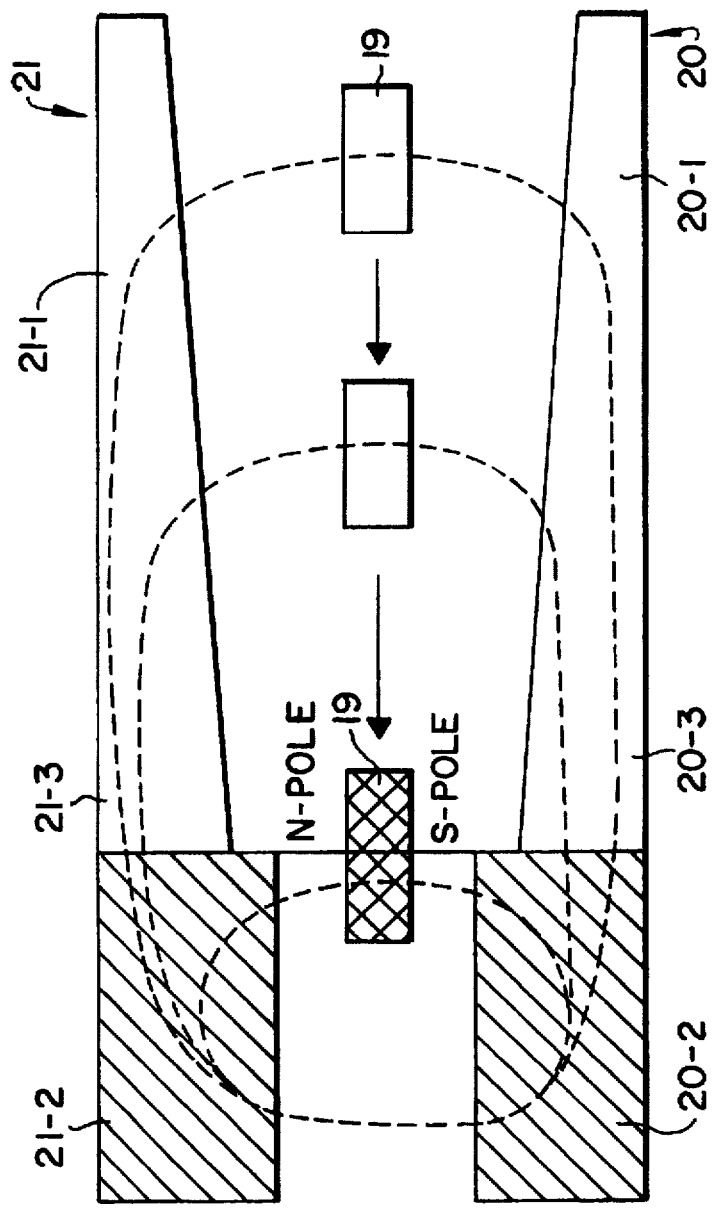

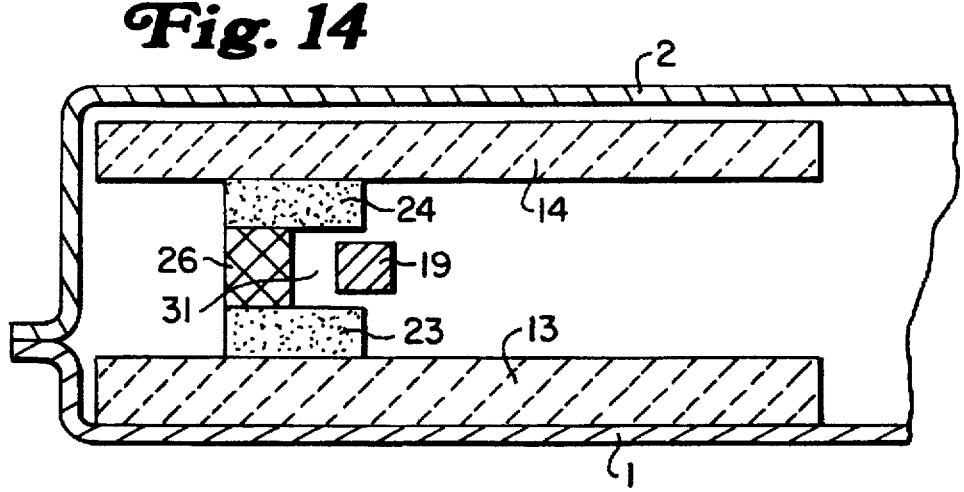
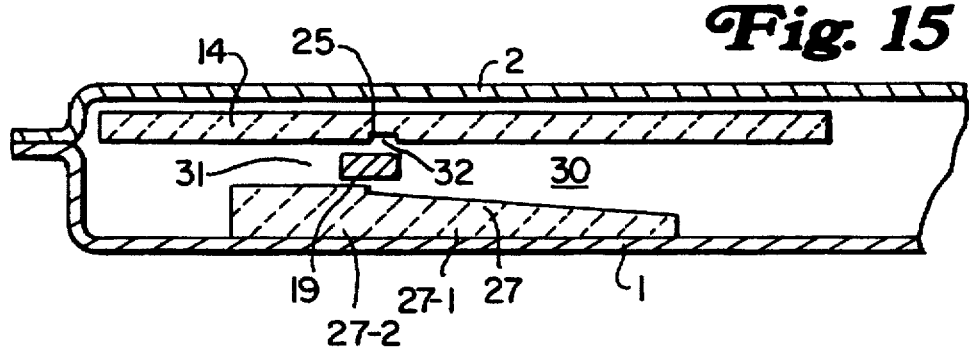
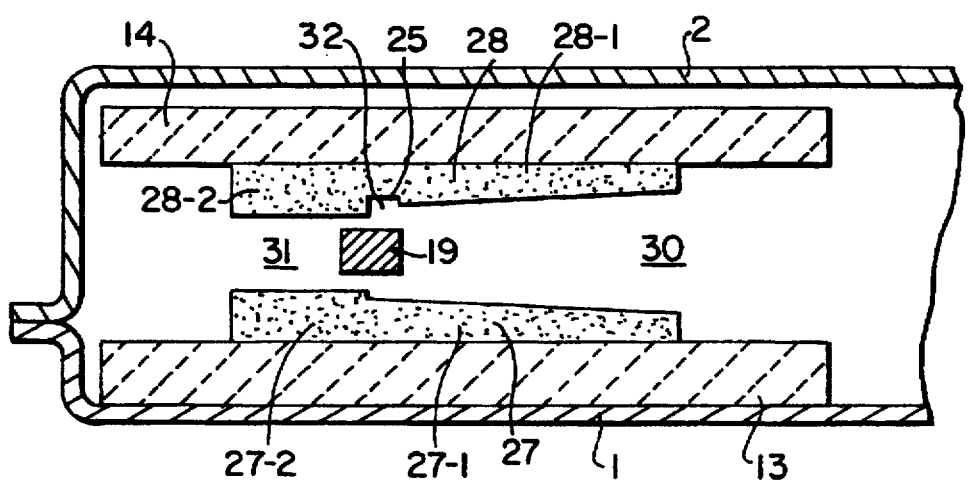

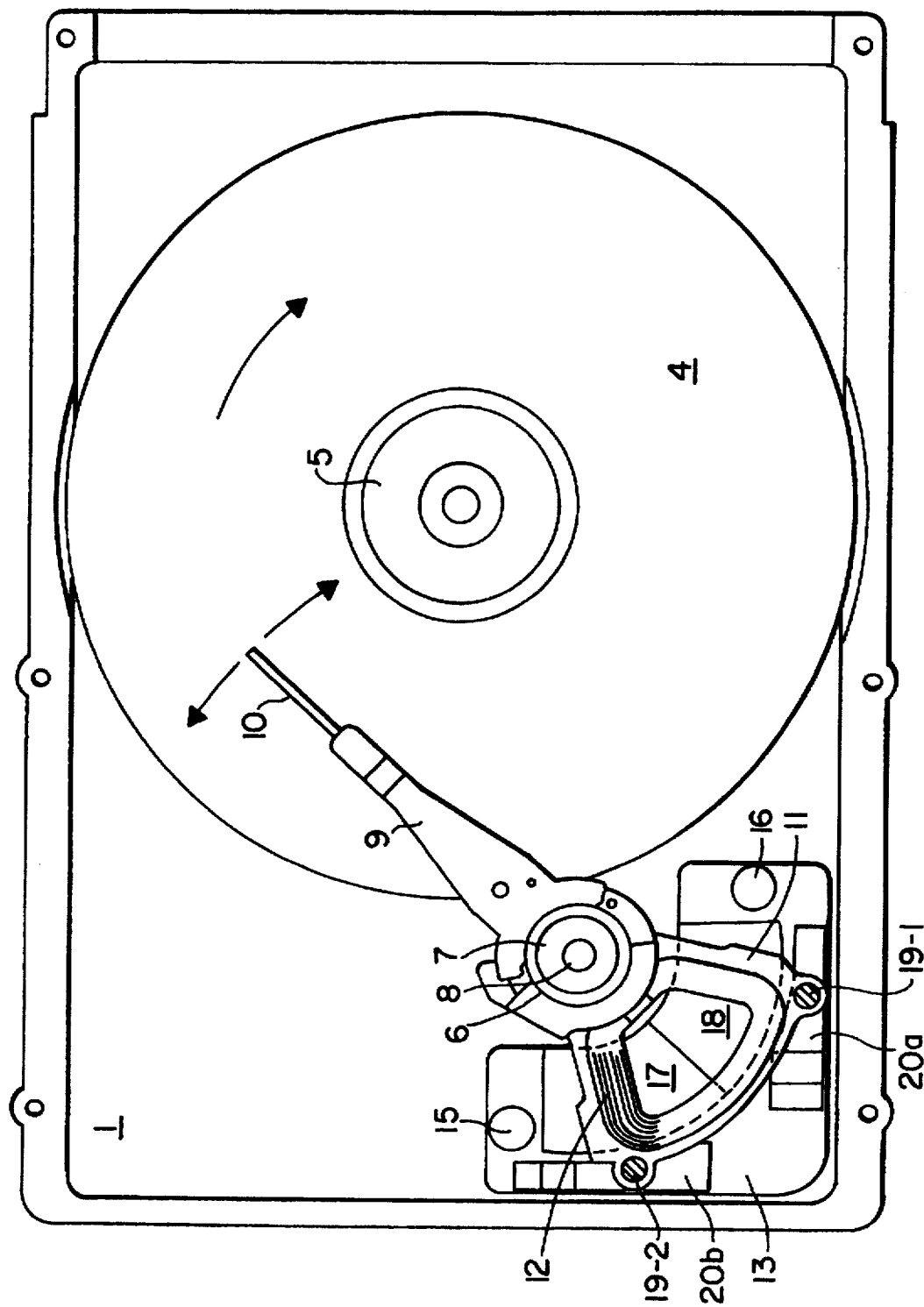

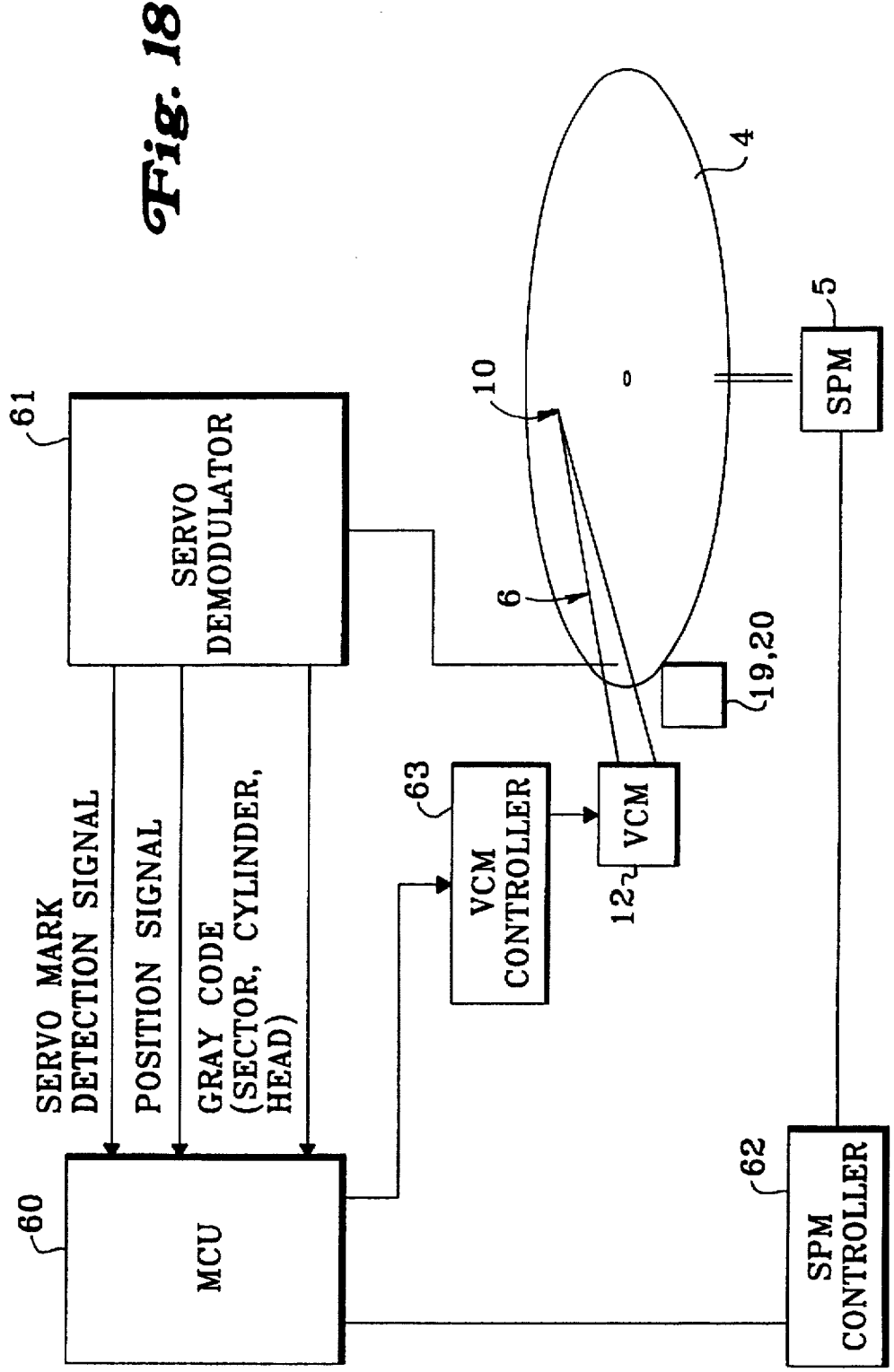

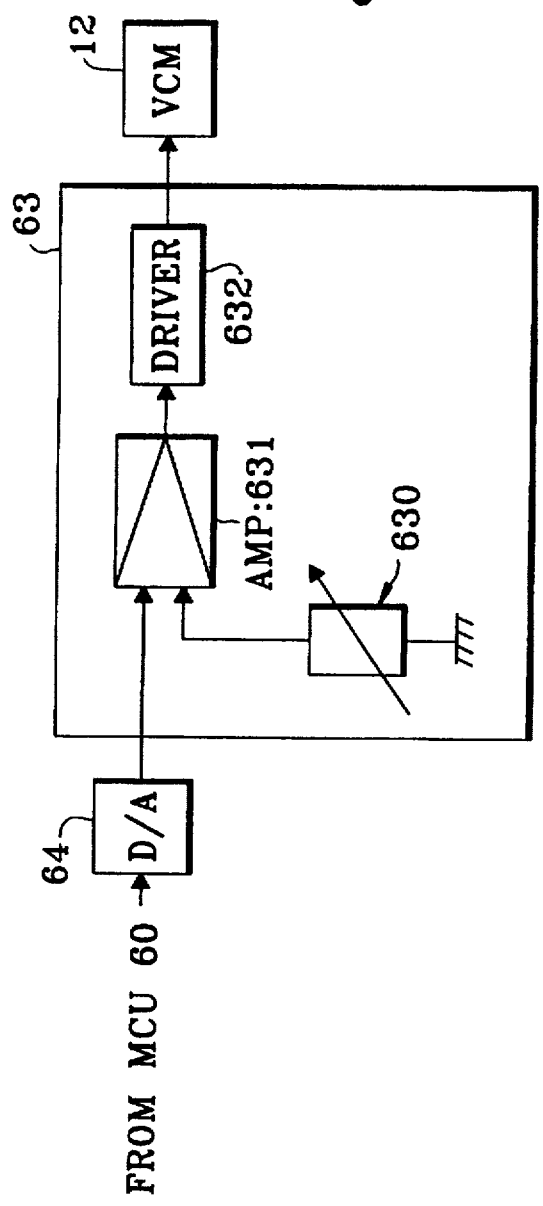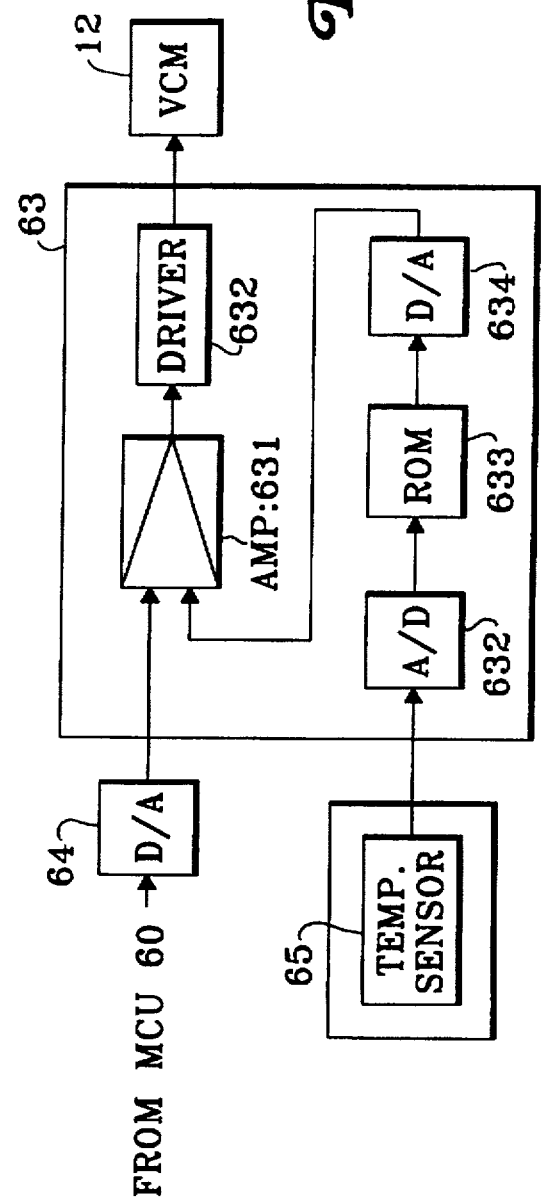

Fig. 28

| SET POINT | DA CONVERTER | | AD CONVERTER | | DA-AD | | DA CONVERTER 12 |
|---|---|---|---|---|---|---|---|
| 1 | A | 10 | A1 | 08 | A2 | 08 | 88 |
| 2 | B | 50 | B1 | 45 | B2 | 0b | 8b |
| 3 | C | 90 | C1 | 80 | C2 | 10 | 90 |
| 4 | D | e0 | D1 | dd | D2 | 03 | 83 |
| | | | | | INITIAL SET VALUE=> | | 80 |

MAGNETIC DISK DRIVE WITH AUTOMATIC ACTUATOR AND LOCKING STRUCTURE

This application is a continuation application Ser. No. 08/317,034 filed on Oct. 3, 1994, now abandoned.

BACKGROUND OF THE INVENTION

1. Field of the Invention

The present invention relates to a magnetic disk drive for automatically retracting an actuator mounted with a magnetic head to a predetermined position and locking the actuator.

2. Description of the Related Art

In recent years, with a spread of a portable personal computer, a file device is mounted in this apparatus. This file device demanded is small in size but strong and, besides, durable under any using environment. Particularly, a desirable magnetic disk drive is resistive against an impact and vibrations during a non-operation.

FIG. 29A is a view illustrating a construction of the prior art. FIG. 29B is a diagram showing a torque characteristic in the prior art.

In the magnetic disk drive, when the magnetic disk is not rotated (during non-operation), the magnetic head contacts the magnetic disk, and, therefore, impact on and vibrations to the magnetic disk drive are a serious problem. If the impact and vibrations are applied to the magnetic disk drive due to some cause, the magnetic head damages a recording surface of the magnetic disk, resulting in a destruction of contents of the data. Accordingly, if the impact and vibrations are applied to the magnetic disk drive, it is required that resultant damages be prevented at the minimum.

For preventing those damages, there has been adopted a method of retracting the magnetic head from a data area on the magnetic disk and locking it in a safety area. This structure is termed a retract-and-lock structure.

As illustrated in FIG. 29A, as one means of this structure, there is proposed an apparatus (International Application No. JP92/01356, filed on Oct. 19, 1992) including a movable permanent magnet 80 fixed to an actuator and a fixed yoke 81 constituting a magnetic circuit in cooperation with the movable permanent magnet 80. Based on this construction, the movable permanent magnet 80 is attracted by a magnetic force in such a direction as to fix the actuator in the magnetic circuit, thus performing retract and lock operations.

That is, according to this construction, the fixed yoke 81 has a gap g in which the movable permanent magnet 80 is located. This gap g has a slope area and a small-gap-width area. Accordingly, as shown in FIG. 29B, a force of torque generated by the movable permanent magnet 80 and the fixed yoke 81 depicts a curve exhibiting a constant inclination at the slope area of the gap g and a maximum torque at a stepped portion between this slope area and the narrow gap area. For this reason, the movable permanent magnet 80 located leftward in FIG. 29A is attracted rightward along the slope area of the gap g, subsequently retracted and further locked in the narrow gap area. With this operation, the actuator and the magnetic head are retracted from the data area to the safety area and then locked.

There arises, however, a problem inherent in the prior art, wherein, as illustrated in FIG. 29B, the lock position of the actuator is at the right end of the fixed yoke 81; and the actuator is easy to move against the impact and the vibrations because of the force of torque being weak at the right end of this fixed yoke 81 and is incapable of being firmly locked.

Further, as shown in FIG. 29A, the fixed yoke 81 is mechanically connected at the right end in the Figure. Accordingly, a magnetic force to the movable permanent magnet 80 is a sum of an attracting force by which the movable permanent magnet 80 is attracted to the narrow gap area and a force of a magnetic flux loop formed by the permanent magnet 80 and the fixed yoke 81. Since this fixed yoke 81 is mechanically connected, this loop-of-flux force becomes stronger as it approaches the lock position. Hence, as shown in FIG. 29B, the force of torque in the data area rises gently. As a result, an offset force based on the retract force in this area augments, and offset control during a seek becomes complicated.

Similarly, as illustrated in FIG. 29A, in the fixed yoke 81, the slope area is connected directly to the narrow gap area. For this reason, as shown in FIG. 29B, the torque curve gently rises in the vicinity of the data area and the safety area, and hence the offset force to the actuator at this portion increases. Further, the offset control becomes intricate.

SUMMARY OF THE INVENTION

It is a primary object of the present invention to provide a magnetic disk drive for locking an actuator by effectively using a force of torque generated.

It is another object of the present invention to provide a magnetic disk drive for locking the actuator in such a position that the force of torque generated is maximized.

It is still another object of the present invention to provide a magnetic disk drive for uniformizing the force of torque generated in a data area.

To accomplish the above objects, according to one aspect of the present invention, there is provided a magnetic disk drive comprising: a magnetic disk; a rotary mechanism for rotating the magnetic disk; a rotary actuator rotating about a rotary shaft; a coil, provided at one end of the rotary actuator, for rotating the rotary actuator; a magnetic head attached to the other end of the rotary actuator; a yoke of a main magnetic circuit for giving a driving force for driving the coil; at least one magnet provided on the rotary actuator; a fixed yoke member forming a magnetic circuit for the magnet in all or a part of a movable range of the rotary actuator; and a stopper member for setting a rotation stop position of the rotary actuator in such a position that a torque by the fixed yoke member and the magnet is maximized.

According to this aspect of the present invention, there is provided the stopper member for setting the stop position of the rotary actuator in the position where the torque generated by the fixed yoke member and the magnet is maximized. Accordingly, the magnet and the rotary actuator are locked in the position where the torque is maximized. With this construction, the force of torque can be effectively employed, and, therefore, a force holding the lock position becomes strong against the external impact and vibrations.

According to another aspect of she present invention, there is provided a magnetic disk drive comprising: at least a single piece of magnetic disk; a rotary mechanism for rotating the magnetic disk; a rotary actuator rotating about a rotary shaft; a coil, provided at one end of the rotary actuator, for rotating the rotary actuator; a magnetic head attached to the other end of the rotary actuator; a yoke of a main magnetic circuit for giving a driving force for driving the coil; at least one magnet provided on the rotary actuator; and one pair of fixed yoke members forming a magnetic circuit for the magnet in all or a part of a movable range of the rotary actuator and including a first area having a gap width uniformly reduced in a lock direction to retract the rotary actuator and a second area having a gap width smaller than a gap width of the first area to lock the rotary actuator, the fixed yoke members being mechanically separated from each other.

According to this aspect of the present invention, there are provided one pair of fixed yoke members mechanically separated, and, hence, a loop-of-flux force produced by the pair of yoke members and the magnet weakens. Accordingly, a torque curve in close proximity to the safety area on the magnetic disk is flattened, thereby facilitating offset control during a seek.

According to still another aspect of the present invention, there is provided a magnetic disk drive comprising: at least a single piece of magnetic disk; a rotary mechanism for rotating the magnetic disk; a rotary actuator rotating about a rotary shaft; a coil, provided at one end of the rotary actuator, for rotating the rotary actuator; a magnetic head attached to the other end of the rotary actuator; a yoke of a main magnetic circuit for giving a driving force for driving the coil; at least one magnet provided on the rotary actuator; and a fixed yoke member forming a magnetic circuit for the magnet in a movable range of the rotary actuator and including a second area having a minimum gap width to lock the rotary actuator, a first area having such a gap that a gap width becomes smaller as it approaches the second area to retract the rotary actuator and a third area formed between the second area and the first area and having a gap width larger than a gap width of the second area.

According to this aspect of the present invention, the fixed yoke member includes the third area formed between the fist area and the second area, and it is therefore possible to flatten the torque curve of the retract force at a boundary between the data area and the safety area on the magnetic disk. In consequence, the retract torque in the entire data area can be made constant.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIGS. 7A–7C together form a diagram of assistance in explaining a lock positioning operation in the construction of FIG. 6A;

FIG. 10 is a view of assistance in explaining a loop of magnetic flux in the construction of FIG. 6A;

FIG. 14 is an explanatory diagram showing a second example of modification of the retract/lock mechanism of the present invention;

FIG. 15 is an explanatory diagram showing a third example of modification of the retract/lock mechanism of the present invention;

FIG. 16 is an explanatory diagram showing a fourth example of modification of the retract/lock mechanism of the present invention;

FIG. 17 is an explanatory diagram showing a fifth example of modification of the retract/lock mechanism of the present invention;

FIG. 18 is a block diagram illustrating one embodiment of the present invention;

FIG. 24 is a block diagram showing one embodiment of a VCM control circuit of FIG. 18;

FIG. 25 is a block diagram showing an example of modification of the VCM control circuit of FIG. 18;

FIG. 28 is an explanatory diagram of a table in FIG. 27; and

DETAILED DESCRIPTION OF THE PREFERRED EMBODIMENTS

Figure 1A:
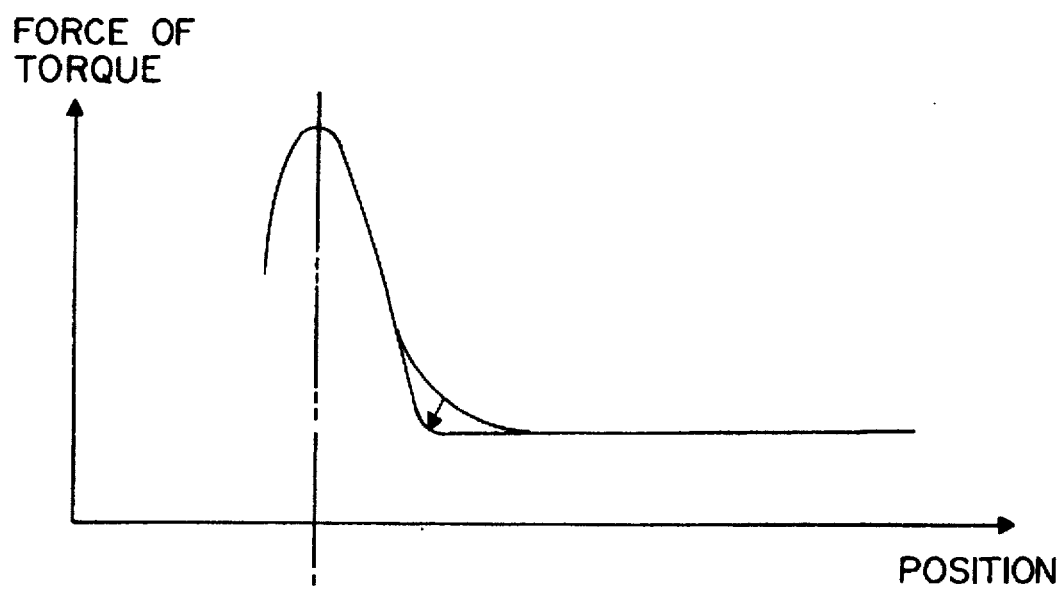
FIGS. 1A and 1B together form a diagram showing the principle of the present invention.
Figure 1B:
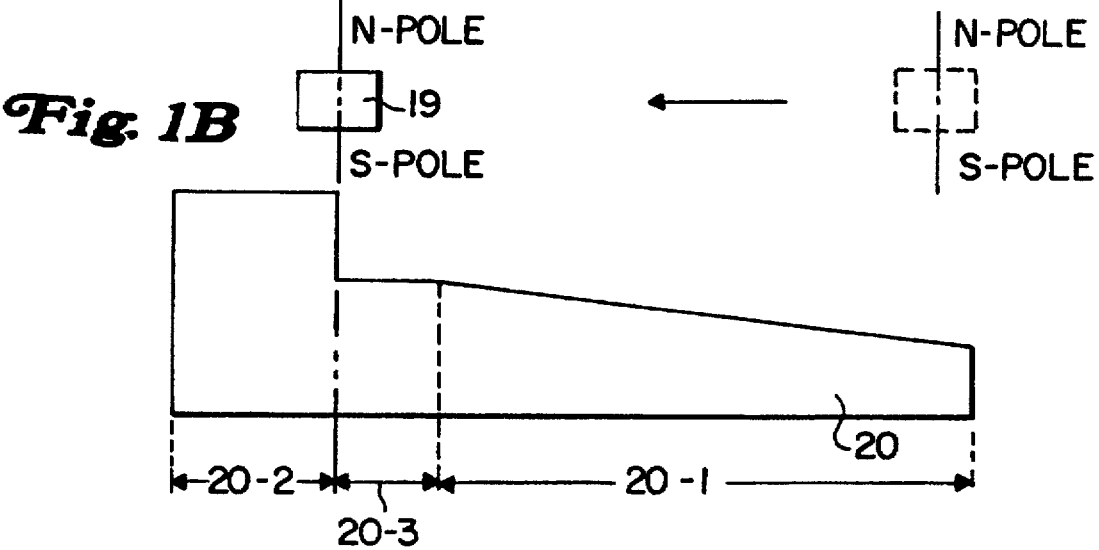

FIG. 1A and 1B together form a diagram of the principle of the present invention.

A lock position of a rotary actuator is set by a stopper for regulating a rotational position of the rotary actuator. Then, as illustrated in FIG. 1, a stop position (i.e., lock position) of a permanent magnet 19 attached to the rotary actuator is set in a position of the maximum force-of-torque generated by a fixed yoke 20 and the permanent magnet 19. For this reason, the stopper position is set so that the maximum force-of-torque position becomes the stop position.

Further, the fixed yoke 20 includes a second area 20-2 having a minimum gap width in order to lock the rotary actuator. The yoke 20 also includes a first area 20-1 having such a gap that the gap width becomes narrower as it approaches the second area in order to retract the rotary actuator. The yoke 20 further includes a third area having a gap width larger than the gap width of the second area but formed between the second area and the first area. with this arrangement, as shown in FIG. 1A, a torque curve becomes flat in a data area but steep in an safety area. Accordingly, a retract force (offset force) can be uniformized in the data area.

Moreover, in the case of providing a pair of fixed yokes 20 up and down, the pair of fixed yokes are mechanically separated. With this separation, the retract force exhibits no fluctuation in the second area of the fixed yoke.

Figure 2:
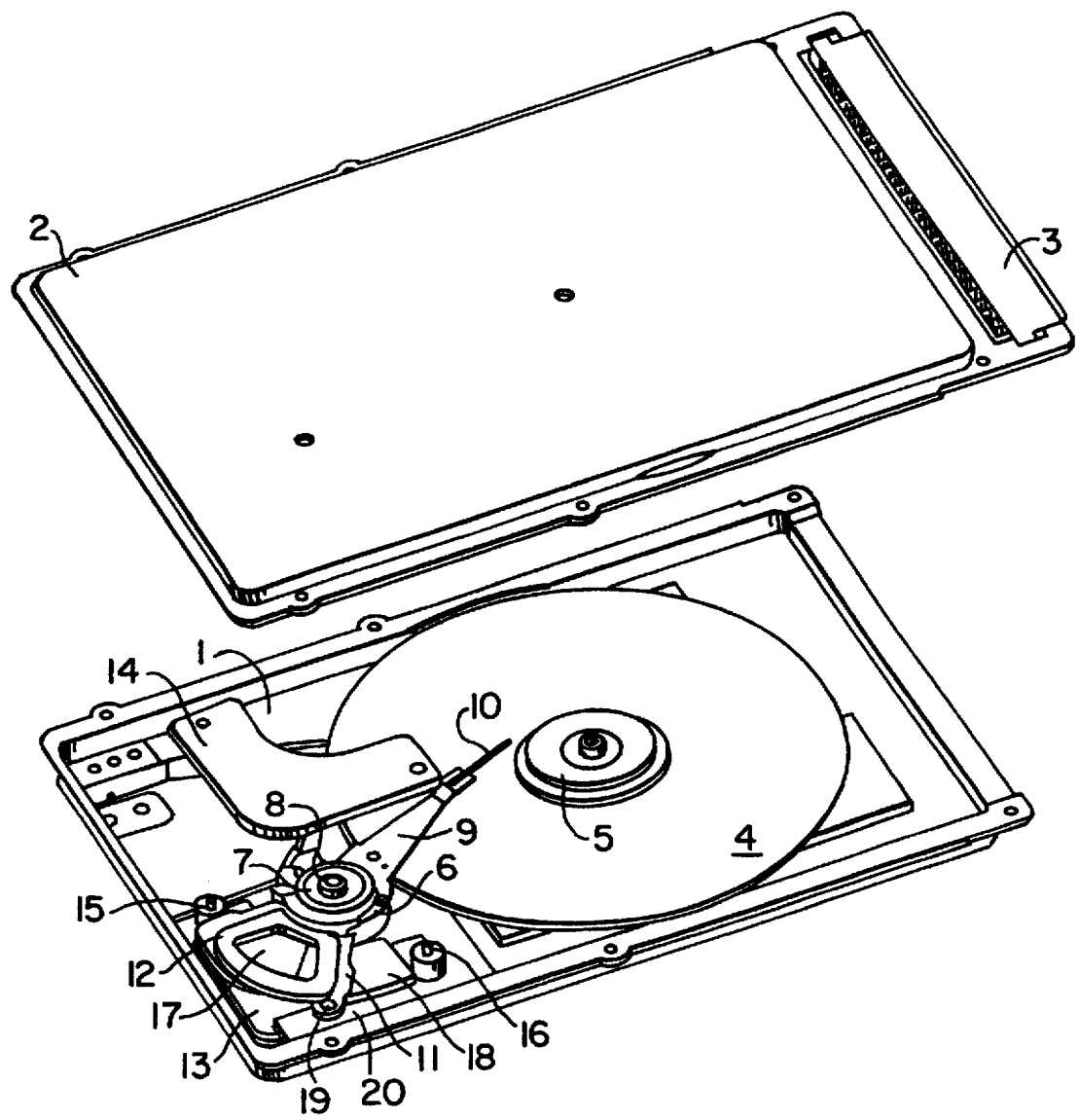
FIG. 2 is a perspective view illustrating a magnetic disk drive in one embodiment of this invention.
Figure 3:
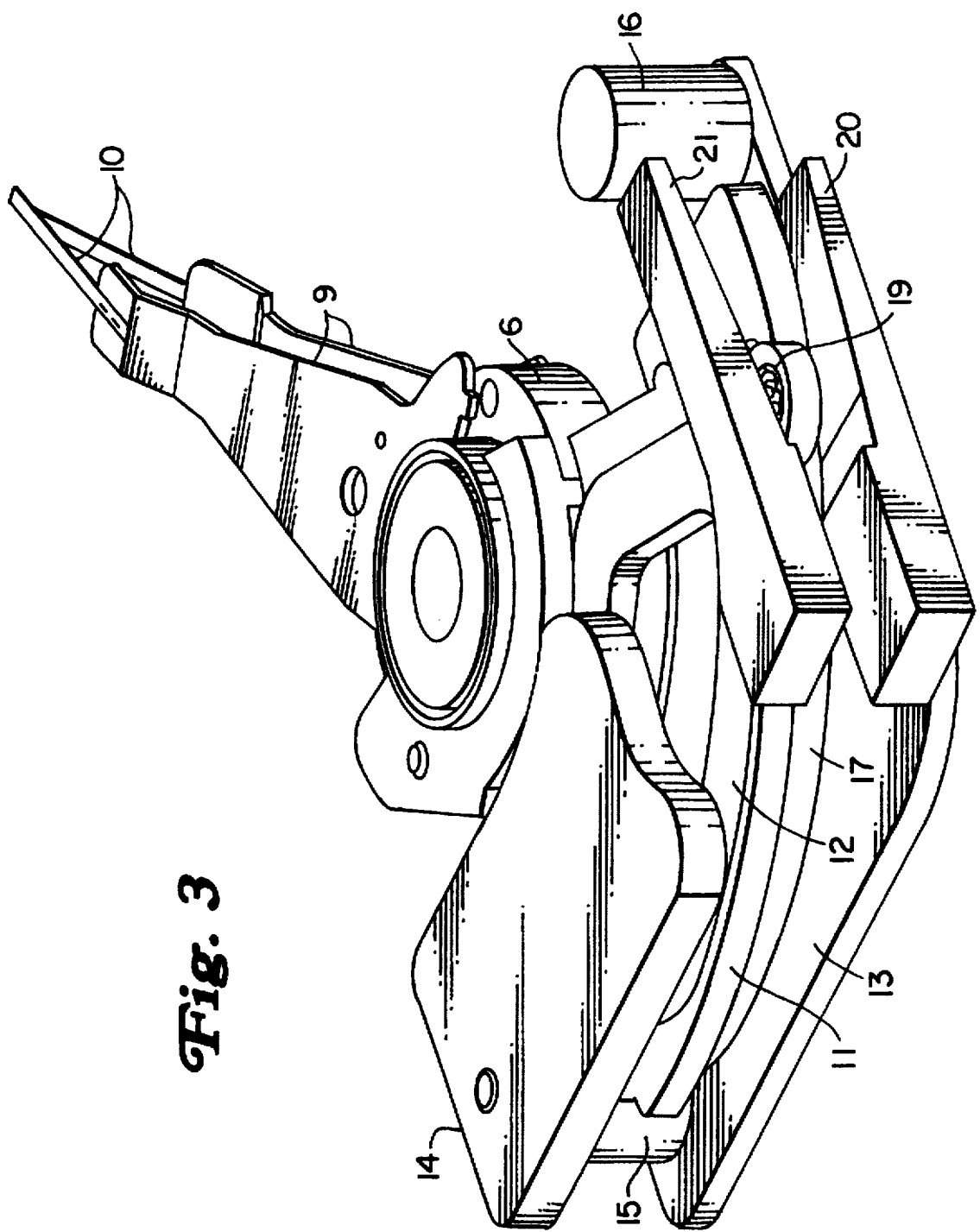
FIG. 3 is a perspective view of a retract/lock mechanism of FIG. 2.
Figure 4:
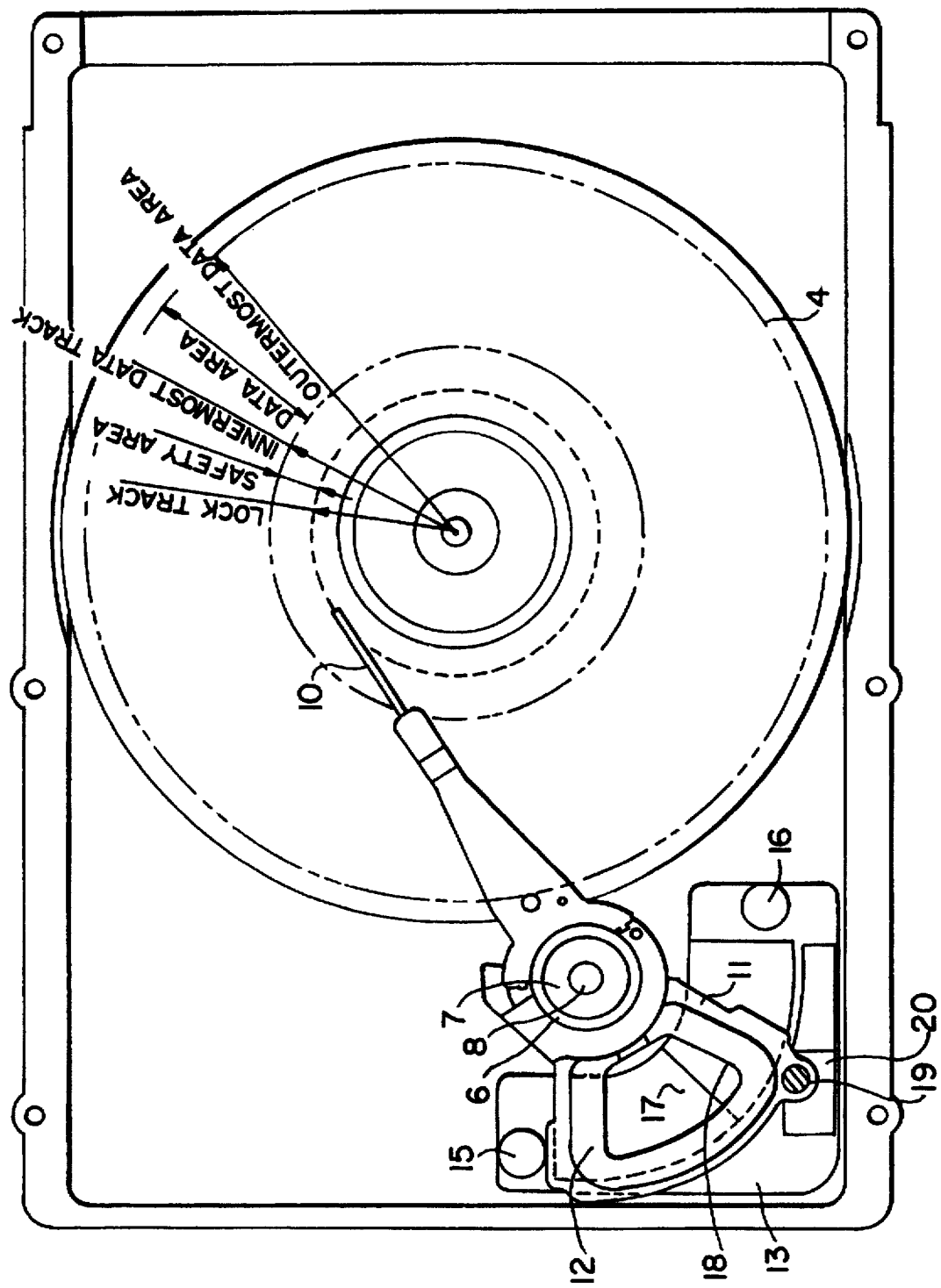
FIG. 4 is a diagram showing a state in a lock position in the construction of FIG. 2.
Figure 5:
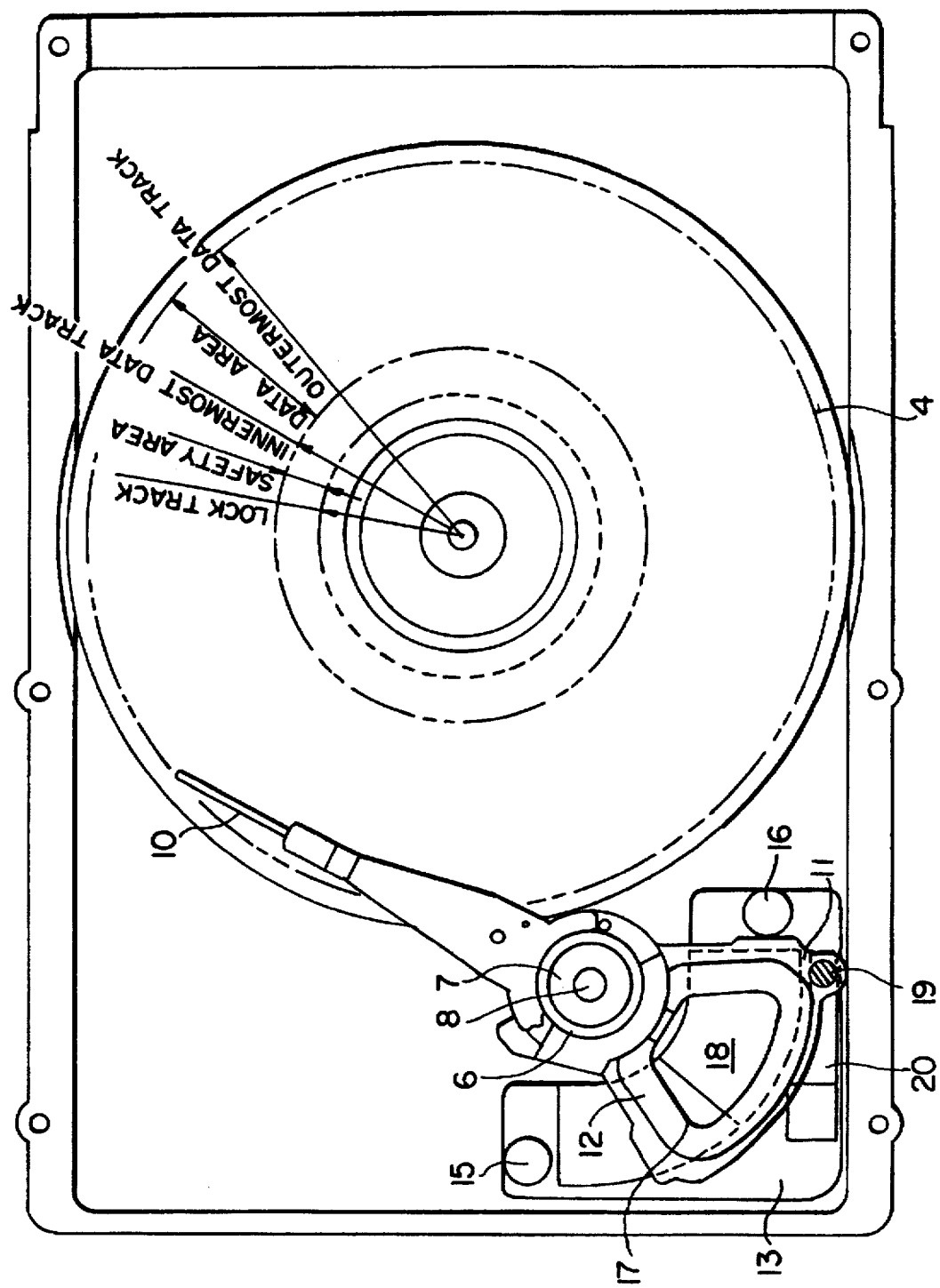
FIG. 5 is a diagram showing a state in an outermost position in the construction of FIG. 2.

FIG. 2 is a perspective view illustrating a magnetic disk drive in one embodiment of the present invention. FIG. 3 is a perspective view depicting a retract/lock mechanism. FIG. 4 is a view showing a state in the lock position. FIG. 5 is a view showing a state in an outermost position.

As illustrated in FIG. 2, a housing base 1 is provided with a spindle motor 5. The spindle motor 5 supports a magnetic disk but rotates this disk. A housing cover 2 is fitted with an external connector 3 for an electrical connection to the outside. Then, the cover 2 covers the base 1 and thus hermetically closes the interior.

An actuator 6 is rotatably attached to a shaft 8 secured to the base 1 through a bearing 7. This shaft 8 is a rotary shaft for the actuator 6. At least one arm 9 is fitted to one end of the actuator 6. A front end of this arm 9 is fitted with an integration type head structured such that the magnetic head and a head support spring are constructed into one united body. This integration type head 10 records and reproduces data on and from a magnetic disk 4.

On the other hand, the other end of the actuator 6 is mounted with a support member 11 and a coil 12 provided on the support member 11. As illustrated in FIG. 3, a main magnetic circuit for giving a driving force to this coil 12 is constructed of upper and lower yokes 13, 14, side yokes 15, 16 and permanent magnets 17, 18.

The lower yoke 13 is fixed to the housing base 1 but disposed in face-to-face relationship with the upper yoke 14. The side yokes 15, 16 bridge the lower yoke 13 and the upper yoke 14. Then, these side yokes 15, 16 collide with the coil support member 11 of the actuator 6 and serve as a stopper for regulating the rotational position of the actuator 6. The first and second permanent magnets 17, 18 are attached to the lower yoke 13.

As depicted in FIG. 3, the coil 12 is disposed in a magnetic gap formed between the first and second permanent magnets 17, 18 and the upper yoke 14. Accordingly, the coil 12 and the main magnetic circuit cooperate to constitute a voice coil motor.

When an unillustrated control circuit flows an electric current across the coil 12, a driving force is produced in the coil 12 disposed in the magnetic gap of the main magnetic circuit. The actuator 6 is thereby rotated about the shaft 8 to move (seek) the magnetic head 10 to a target track on the magnetic disk 4.

As illustrated in FIG. 3, the movable permanent magnet 19 of the retract/lock mechanism is fixed to the coil support member 11. Further, the lower fixed yoke 20 and an upper fixed yoke 21 of the retract/lock mechanism constitute the magnetic circuit with the movable permanent magnet 19 over a movable range of the actuator 6. Then, the movable permanent magnet 19 is located in the magnetic gap formed between the pair of fixed yokes 20 and 21.

Next, the lock position will be explained with reference to FIG. 4. As illustrated in FIG. 4, on the magnetic disk 4, data tracks extend from an outermost peripheral data track to an innermost peripheral data track, and an safety area is provided along the internal periphery thereof. A lock track is set in this safety area.

The lock position is a rotational position of the actuator 6 when the head 10 is located on this lock track. In this lock position, an edge portion of the coil support member 11 of the actuator 6 collides with one stopper (side yoke) 15. At this time, as will be stated later, the movable permanent magnet 19 provided on the coil support member 11 is located in the maximum torque position of the fixed yokes 20, 21.

As shown in FIG. 5, when the magnetic head 10 is located in the outermost position, the edge portion of the coil support member 11 of the actuator 6 collides with the other stopper (side yoke) 16. Hereat, as will hereinafter be discussed, the movable permanent magnet 19 provided on the coil support member 11 is located at the edges of the fixed yokes 20, 21.

Figure 6A:
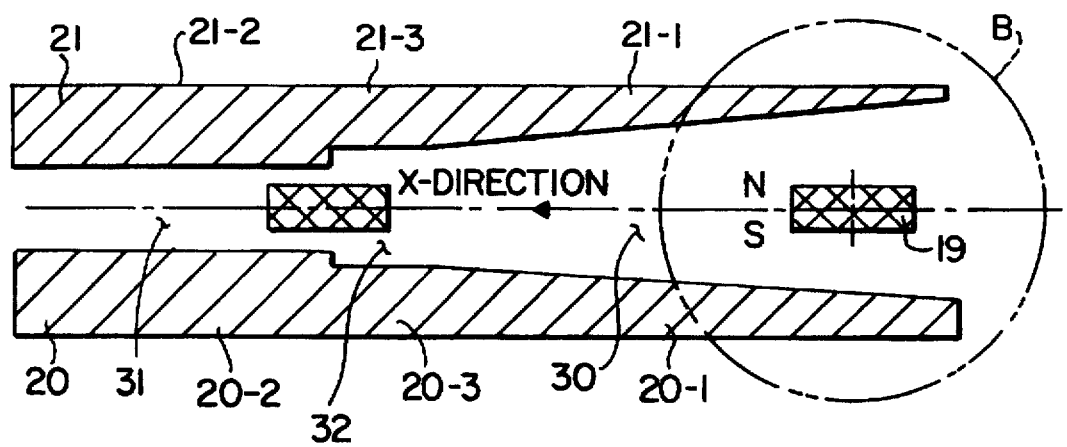
FIG. 6A is a view of assistance in explaining an operation in the construction of FIG. 3.
Figure 6B:
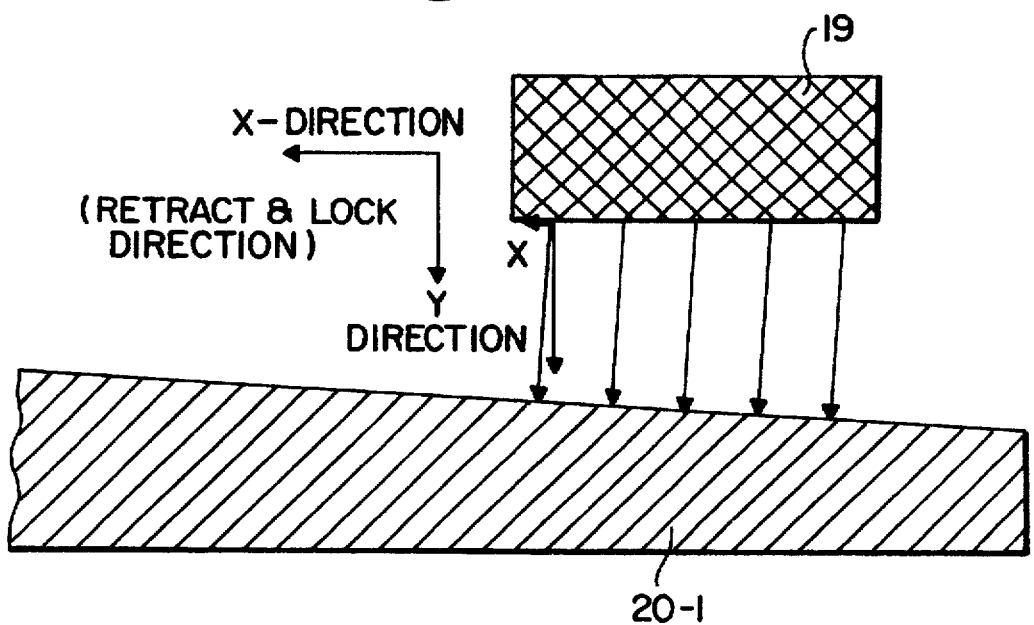
FIG. 6B is an enlarged view showing a portion of FIG. 6A.

FIG. 6A is a sectional view showing the retract/lock mechanism. FIG. 6B is a partially enlarged view of FIG. 6A. FIGS. 7 and 8 are diagrams of assistance in explaining the lock position in FIG. 6A. FIG. 9 is a diagram of assistance in explaining the third area in FIG. 6A. FIG. 10 is a diagram of assistance in explaining a loop of magnetic flux in FIG. 6A.

As illustrated in FIG. 6A, the pair of fixed yokes 20, 21 have first areas 20-1, 21-1 which define such a magnetic gap 30 that the gap 30 is uniformly narrowed in a lock direction of the actuator. The fixed yokes 20, 21 also have third areas 20-3, 21-3 formed subsequent to the first areas 20-1, 21-1, which third areas define a magnetic gap 32 that is uniform but larger than a gap width 31 between the second areas 20-2 and 21-2. The fixed yokes 20, 21 further have second areas 20-2, 21-2 formed subsequent to the third areas 20-3, 21-3, which second areas define the second magnetic gap 31 that is uniform but narrower than the first magnetic gap 30 and the third magnetic gap 32 as well.

First, a retract operation will be explained. A magnetic attracting force works between the movable permanent magnet 19 and the fixed yokes 20, 21. If an NS magnetic flux direction of the movable permanent magnet 19 is completely orthogonal to the surfaces of the fixed yokes 20, 21, the magnetic attracting force works in only an up-and-down direction (Y-direction) in FIG. 6B, but no force is obtained in an X-direction (direction of the lock position).

As illustrated in FIG. 6B, however, in the first areas 20-1, 21-1, the magnetic gap 30 is tapered so that the gap width of the magnetic gap 30 is reduced toward the lock direction. The magnetic attracting force acts in directions perpendicular to the tapered surfaces of the fixed yokes 20, 21, and, therefore, an X-directional component force is generated. For this reason, the movable permanent magnet 19 can be moved (retracted) in the lock direction. If a slope of this taper is steepened, the retract force is enhanced.

In this way, during a non-operation of the magnetic disk drive, the actuator 6 is automatically retracted to the safety area.

Given next is an explanation of a lock force in the lock position.

As depicted in FIGS. 7A–7C, the lock gap 31 between the second areas 20-2 and 21-2 is well narrower than the gap 30 between the tapered surfaces, and hence, in the vicinity of the lock position, the magnetic flux concentrates at the lock gap 31. When the movable permanent magnet 19 completely enters the lock gap 31, however, the magnetic attracting force works in only the Y-direction, but no component force is generated in the X-direction. Therefore, the lock force (acting in the leftward direction in the Figure) with respect to the movable permanent magnet 19 is, as shown in FIGS. 7A–7C, maximized in the vicinity of a boundary of the lock gap 31.

The movable permanent magnet 19 at this time is located so that approximately a half of the movable permanent magnet 19 enters the lock gap 31. Then, the X-directional component force caused by a half, revealed to the outside, of the movable permanent magnet 19 is maximized. The lock force is maximum in this position, resulting in a difficulty of movements in the right-and-left directions in the Figure. A locking strength is maximized in this position and is therefore set as a lock position. Hence, as explained with reference to FIG. 2, the stop position of the stopper (side yoke) 15 is set in such a position that this permanent magnet 19 is locked in the maximum torque position.

Figure 8A:
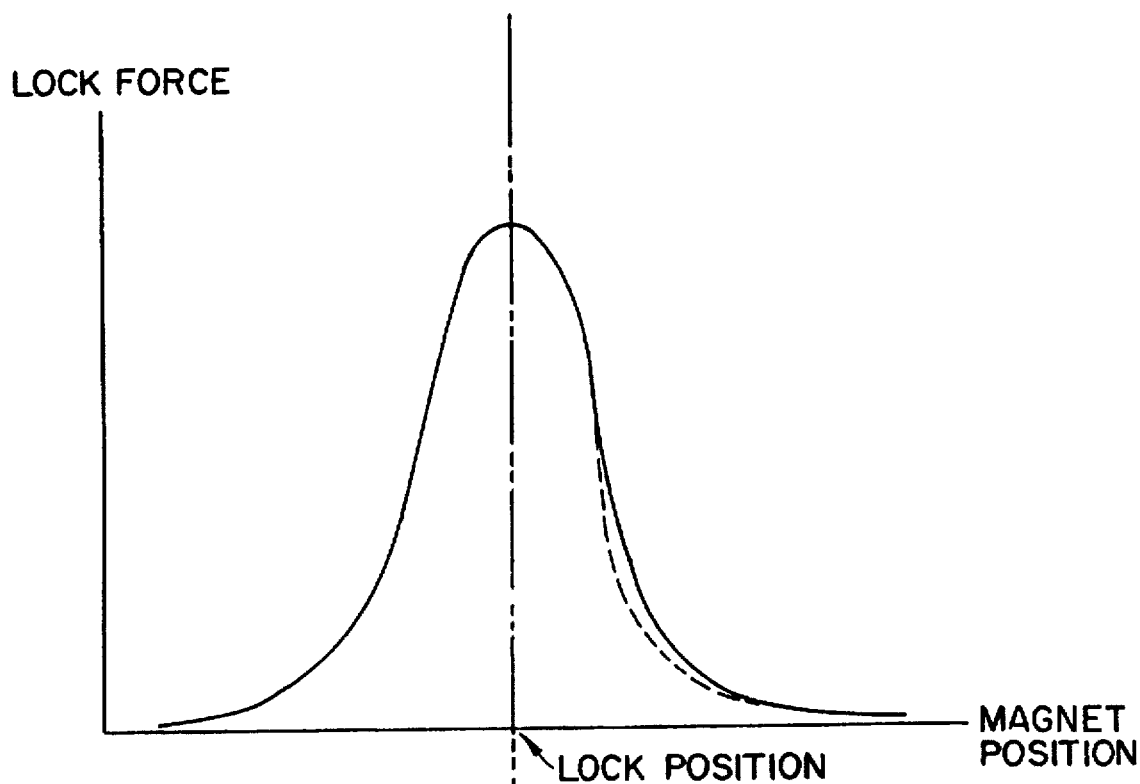
FIG. 8A–8C together form a diagram of assistance in explaining another lock positioning operation in the construction of FIG. 6A.
Figure 8B:
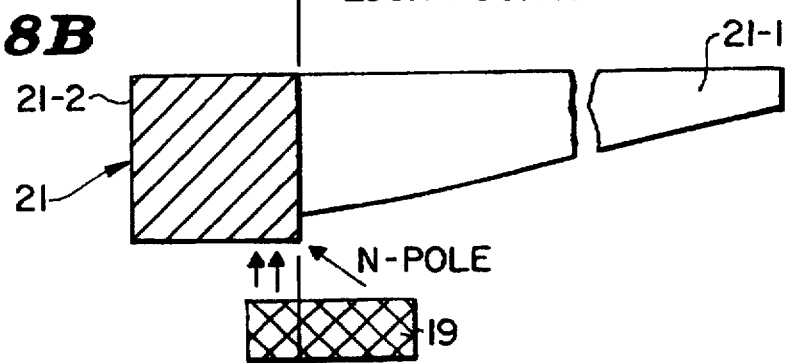
Figure 8C:
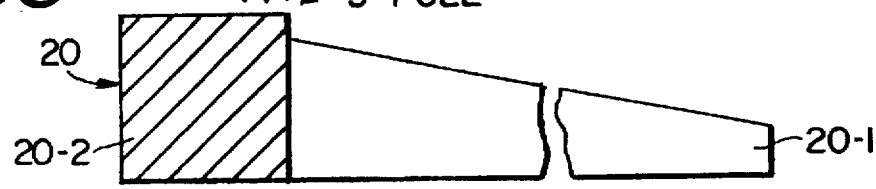

In this case, as shown in FIGS. 8A–8C, it may happen that the lock force is maximized in such a position that approximately ⅓ of the movable permanent magnet 19 enters the lock gap 31, depending on a degree of difference between the lock gap 31 and other gaps 32, 30. Accordingly, the lock position may be set in such a maximum torque position that approximately ⅓ to ½ of the movable permanent magnet 19 enters the lock gap 31.

Figure 9A:
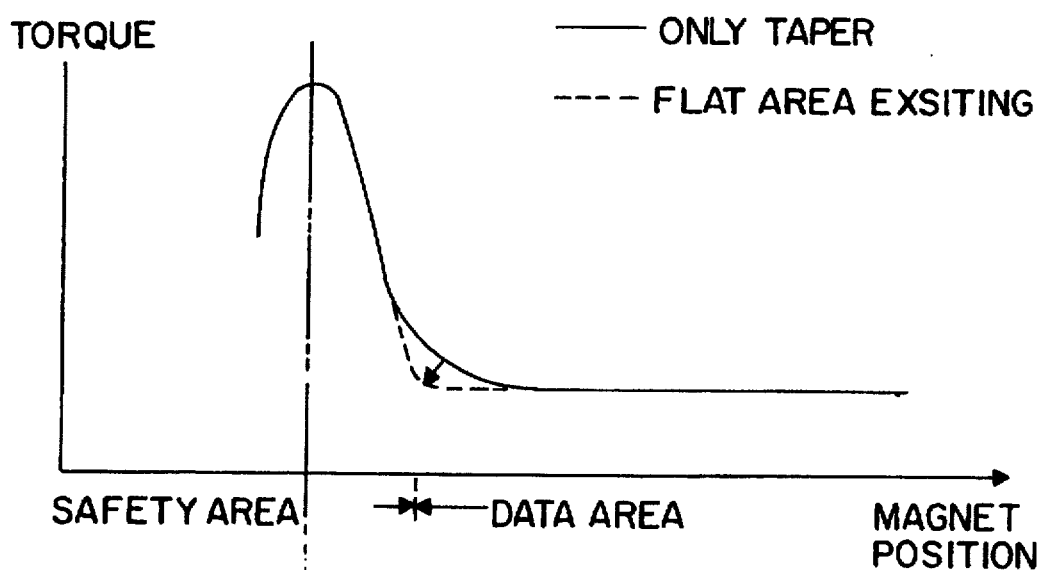
FIG. 9A and 9B together form an explanatory diagram of a third area in the construction of FIG. 6A.
Figure 9B:
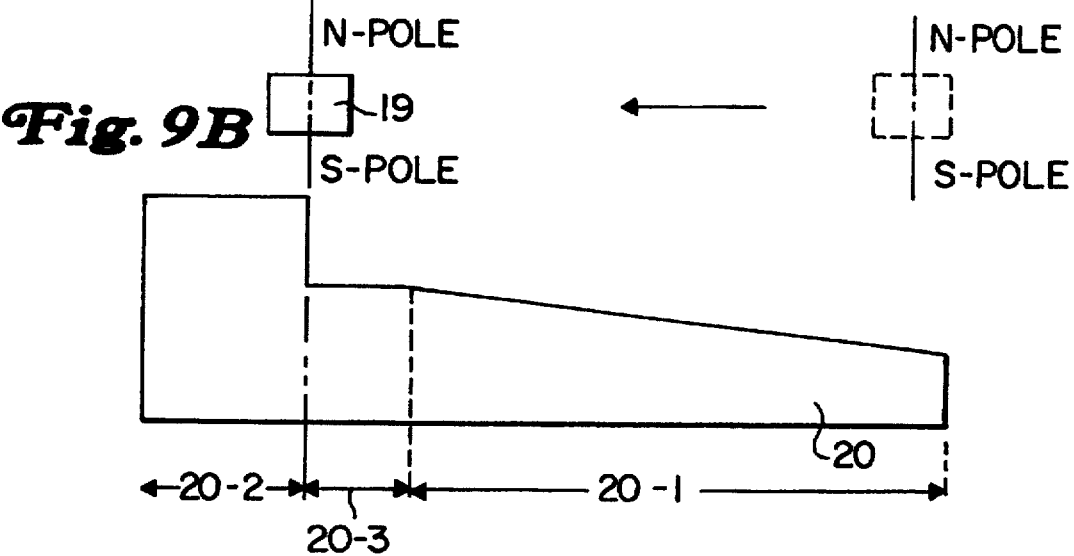

Next, the third area 20-3 will be described referring to FIGS. 9A and 9B. As shown in FIGS. 9A and 9B, the flat third area 20-3 is formed between the second lock area 20-2 and the first retract area 20-1. This third area 20-3 serves to restrain an influence by the torque in the lock gap 31 due to the second area 20-2 and uniformize the torque (retract force) in the data area.

Accordingly, a rise of the force of torque when the movable permanent magnet 19 moves from the first area 20-1 toward the second area 20-2 is steepened. That is, as illustrated in FIG. 9, because of providing the third area 20-3, the force of torque varies from a solid line to a dotted line as shown in the Figure, and therefore a range of the uniform retract force can be increased. In other words, a wider data area can be secured. As a result, the torque curve is flattened even in the boundary between the data area and the safety area, and the control of positioning the actuator is thereby facilitated.

Note that the third area 20-3 is not confined to the flat configuration but may take such other configurations (e.g., a reversely tapered shape having a slope different from the first area) as to relieve the influence by the force of torque (lock force) which changes sharply. In consideration of a nature of manufacturing, however, the flat configuration is preferable.

Next, the loop of magnetic flux will be explained referring to FIG. 10. In accordance with this embodiment, as explained in FIGS. 3 and 6A, the lower yoke 20 is not mechanically connected to the upper yoke 21. The force of torque is a sum of the magnetic attracting force between the movable permanent magnet 19 and the yokes 20, 21 and a loop-of-flux force. If the lower and upper yokes 20, 21 are connected to each other through side yokes as done in the prior art, a magnetic joining force is strengthened, resulting in a larger loop-of-flux force. This loop-of-flux force changes according to a magnetic path and is therefore maximized in close proximity to the lock position. For this reason, as shown in FIG. 9, the rise of the force of torque when the movable permanent magnet 19 moves from the first area 20-1 toward the second area 20-2 becomes sluggish.

In contrast with this, as depicted in FIG. 10, if the lower yoke 20 and the upper yoke 21 are not mechanically connected to each other (i.e., separated), the loop-of-flux force is limited to only a leakage magnetic flux, indicated by dotted lines in the Figure, between the lower yoke 20 and the upper yoke 21 and thus becomes extremely small. Hence, it follows that the force of torque turns out substantially the magnetic attracting force. For this reason, as shown in FIGS. 9A and 9B, the force of torque changes from the solid line to the dotted line in the Figure, thereby uniformizing the force of torque in the data area.

Next, there will be discussed a relationship between the movable permanent magnet 19 and the magnet 18 of the main magnetic circuit for driving the actuator 6 shown in FIG. 3. Considering physical dimensional constraints, there is nothing but to place the movable permanent magnet 19 in the vicinity of the main magnetic circuit. In this case, a difference in terms of torque characteristic is produced due to a relationship between a polarity of the movable permanent magnet 19 and a polarity of the magnet 18 of the main magnetic circuit. It is because a magnetic attracting force between the movable permanent magnet 19 and the magnet 18 of the main magnetic circuit is applied in addition to the magnetic attracting force acting between the fixed yokes 20, 21 and the movable permanent magnet 19.

Figure 11A:
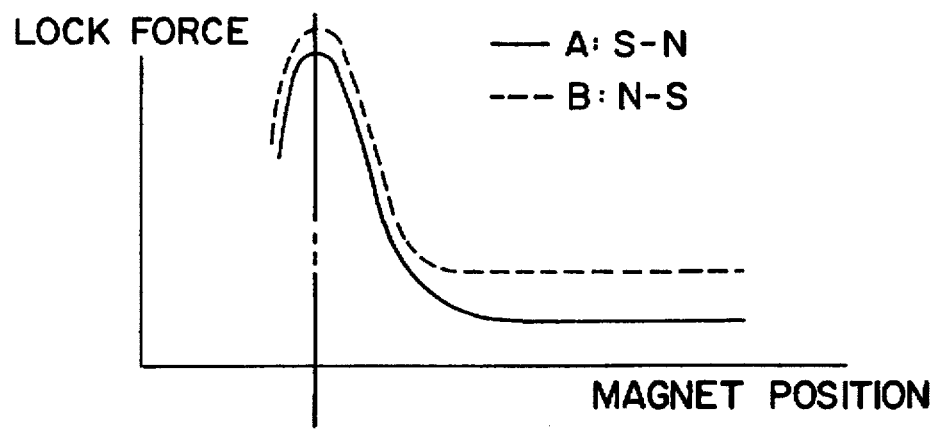
FIG. 11A is a characteristic diagram of a lock force of a movable magnet of FIG. 3.
Figure 11B:
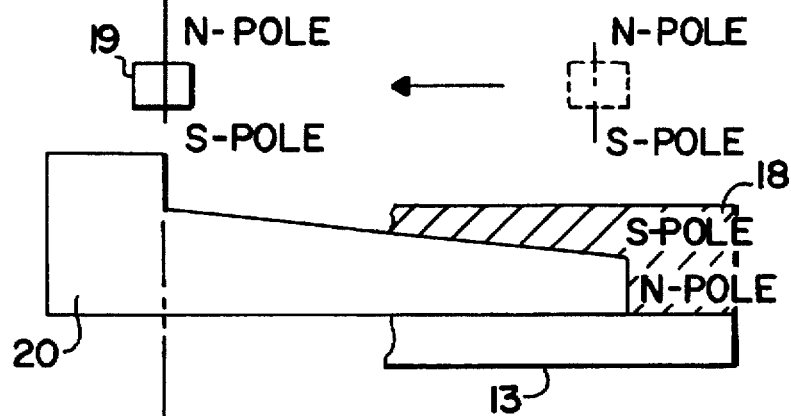
FIGS. 11B and 11C are explanatory diagrams of polarities of the movable magnet of FIG. 11A.
Figure 11C:
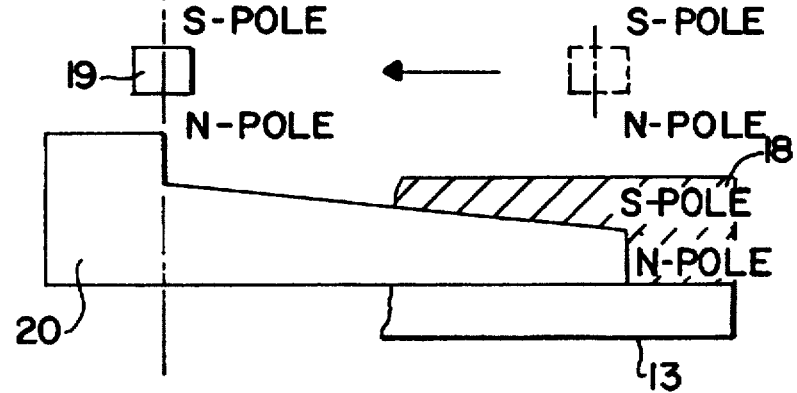

As depicted in FIGS. 2 and 3, in a positional relationship between the movable permanent magnet 19 and the main magnetic circuit, they are close to each other because of down-sizing of the magnetic disk drive. For this reason, the magnetic attracting force between the movable permanent magnet 19 and the magnet 18 of the main magnetic circuit has a magnitude enough not to be ignorable. Given herein is a comparison between a case where a magnetizing direction of the movable permanent magnet 19 is opposite to a magnetizing direction of the magnet 18 of the main magnetic circuit as shown in FIG. 11B and a case where the magnetizing direction of the movable permanent magnet 19 is identical with the magnetizing direction of the magnet 18 of the main magnetic circuit as shown in FIG. 11C. One is the case where a torque characteristic indicated by the dotted line in FIG. 11A acts in a direction opposite to the direction in FIG. 11B, and the other is the case where a torque characteristic indicated by the solid line in FIG. 11A acts in the same direction as that in FIG. 11C.

As obvious from these Figures, the lock force (torque) is larger in the case where the magnetizing direction of the movable permanent magnet 19 is opposite to the magnetizing direction of the magnet 18 of the main magnetic circuit than in the other case. Namely, the movable permanent magnet 19 undergoes a repulsion of the magnet 18 of the main magnetic circuit in the case where the magnetizing direction of the movable permanent magnet 19 is opposite to the magnetizing direction of the magnet 18 of the main magnetic circuit. The torque is thereby increased. In consequence of this, even when the movable permanent magnet 19 is small, a required retract force can be obtained.

Referring next to FIG. 12, a relationship between a size of the movable permanent magnet and the data area will be explained. In a storage device, it is advantageous to secure as broad data area as possible when on the same storage medium. It is required in terms of this point that a sectional area of a movable surface of the movable permanent magnet 19 be restrained down to some extent. On the other hand, when considering a deviation due to a tolerance between the fixed yokes 20, 21 and the movable permanent magnet 19 in the moving direction of the actuator 6, there arises a problem in which almost no torque is obtained if the sectional area of the movable surface of the movable permanent magnet 19 is too small. For this reason, a considerable or larger sectional area of the movable surface of the movable permanent magnet 19 is needed.

From the above, there is given an optimal solution in the sectional area of the movable surface of the movable permanent magnet 19. Herein, as shown in FIG. 12B, when $\theta 3 = \theta 2 \times (0.1 \text{ to } 0.2)$, there is established this formula $\theta 1 \approx \theta 2 \times 0.8$, where $\theta 1$ is the angle of rotation of the data area, $\theta 2$ is the whole movable angle, inclusive of the safety area, of the actuator 6, and $\theta 3$ is the angle of the sectional area of the movable surface of the movable permanent magnet 19. There is no necessity for taking a large safety area, and a sufficient data area can be secured.

Figure 12A:
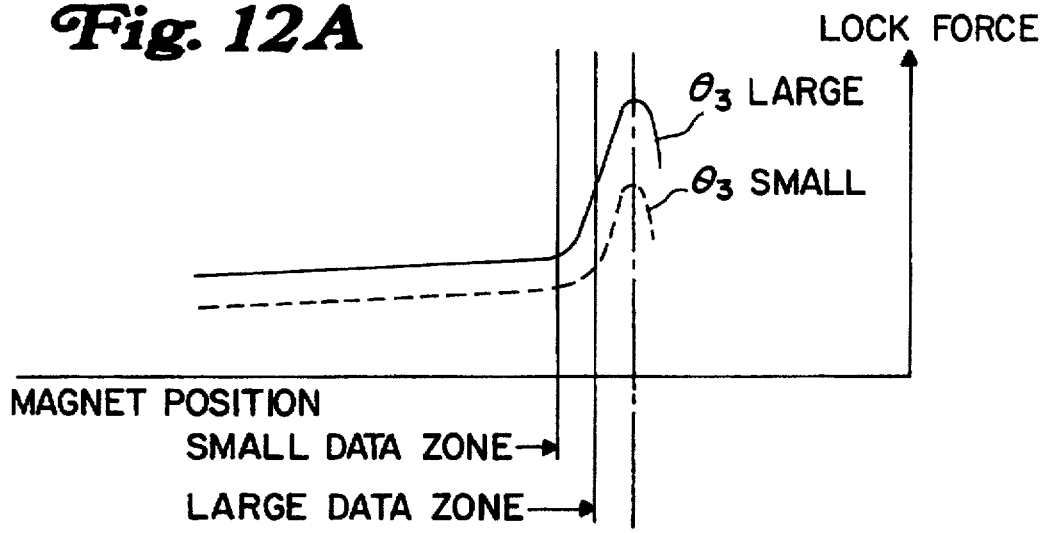
FIGS. 12A and 12B are diagrams of assistance in explaining an occupied area of the movable magnet in the construction of FIG. 3.
Figure 12B:
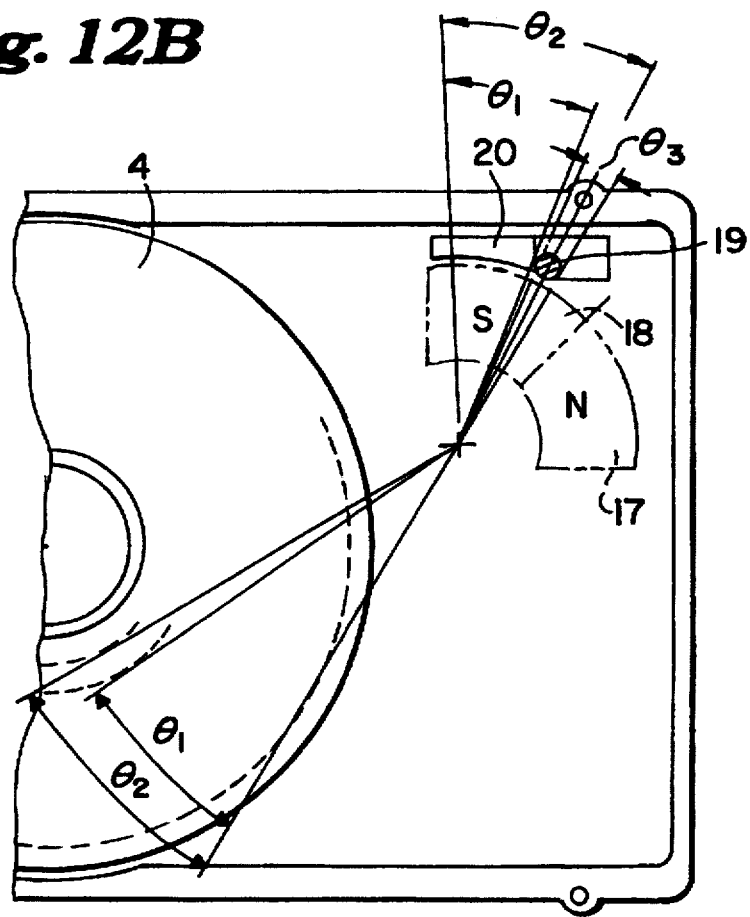

As shown in FIG. 12A, if the angle $\theta 3$ of the sectional area of the movable surface of the movable permanent magnet 19 is large, the data area is reduced. Whereas if $\theta 3$ is small, the retract and lock torques decrease. Accordingly, it is proper that the angle $\theta 3$ of the sectional area of the movable surface of the movable permanent magnet 19 falls within a range of 0.1 to 0.2 with respect to the whole movable angle of the actuator 6.

Figure 13A:
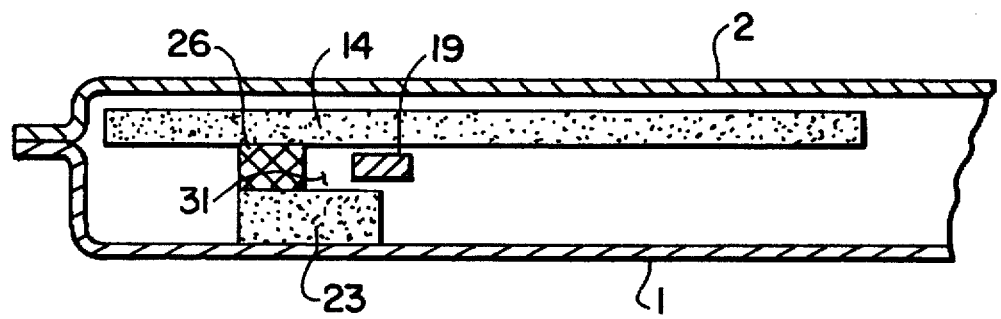
FIGS. 13A and 13B are explanatory diagrams showing a first example of modification of the retract/lock mechanism of the present invention.
Figure 13B:
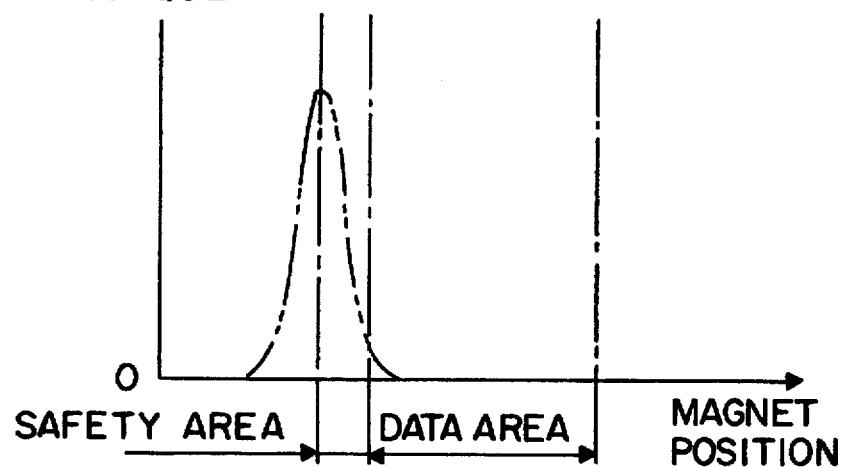

FIGS. 13A and 13B are explanatory diagrams showing a first example of modification of the present invention.

As illustrated in FIG. 13A, the upper yoke 14, shown in FIGS. 2 and 3, of the main magnetic circuit is availed as an upper yoke of the magnetic circuit of the lock mechanism, while a lower yoke 23 is constructed of a yoke which defines the lock gap 31. Accordingly, an automatic retracting operation is not conducted, but only the locking operation is performed. For enhancing the lock torque of this locking operation, the upper yoke 14 is connected via a magnet 26 to the lower yoke 23.

In this example also, the lock position is the maximum torque position in which the magnet 19 enters the lock gap 31. Further, as illustrated in FIG. 13B, the lock force is improved by providing the magnet 26. In this example, the automatic retraction is carried out by use of the electric power or the like, and, therefore, the tapered area (first area) for the automatic retracting operation is not provided. Hence, there is no problem even when the loop-of-flux force is increased by the magnet 26. It is rather preferable to strengthen the loop-of-flux force to enhance the lock force because of effecting only the locking operation.

FIG. 14 is a sectional view showing a second example of modification of the present invention.

As depicted in FIG. 14, for performing the locking operation, an upper fixed yoke 24 is mounted on the upper yoke 14 of the main magnetic circuit. Further, the lower fixed yoke 23 is mounted on the lower yoke 13 of the main magnetic circuit. These upper and lower yokes 23, 24 are constructed of yokes which define the lock gap 31. Accordingly, the automatic retracting operation is not conducted, but only the locking operation is carried out. For increasing the lock torque of this locking operation, the upper yoke 24 is connected via the magnet 26 to the lower yoke 23.

In this example also, the lock position is the maximum torque position in which a part of the magnet 19 enters the lock gap 31. Also, the lock force is enhanced by providing the magnet 26. Moreover, the gap width can be reduced, and hence the lock torque increases.

FIG. 15 is a sectional view showing a third example of modification of the present invention.

FIG. 15 shows the example of modification of the construction of FIG. 6B. That is, as shown in FIG. 15, a lower yoke 27 has a tapered area 27-1 conceived as an inclined portion and an area 27-2 where the gap width is uniform. The upper yoke 14 is a yoke of the main magnetic circuit. Then, the upper yoke 14 is formed with a recess 25 in a position corresponding to a boundary between the tapered area 27-1 and the uniform area 27-2 of the lower yoke 27.

Formed in this example also are such a first gap portion 30 that the gap width is uniformly reduced because of the tapered area 27-1, a third gap portion defined by the tapered area 27-1 and the recess 25 and a second gap portion 31 formed along the uniform area 27-2.

Accordingly, as in the same way with the one explained in FIG. 9, the third gap portion 32 restrains the influence by the torque in the second gap portion 31 and uniformizes the torque (retracting force) in the data area. A rise of the force of torque when the movable permanent magnet 19 moves from the first area 27-1 toward the second area 27-2 is thereby steepened. That is, as illustrated in FIG. 9, by forming the third gap 32, a range of the uniform retract force can be increased, and, therefore, a wider data area can be secured. As a result, the torque curve (retract force) in the data area is flattened, and the control for positioning the actuator is thereby facilitated.

FIG. 16 is a sectional view showing a fourth example of modification of the present invention.

FIG. 16 shows an example of modification of the construction of FIG. 6B. As shown in FIG. 16, an upper yoke 28 is mounted on the upper yoke 14 of the main magnetic circuit. This upper yoke 28 is formed with a tapered area 28-1, a recess 25 and an area 28-2 in which the gap width is uniform. Accordingly, there are formed a first gap portion 30 in which a width of gap defined by the tapered areas 27-1, 28-1 is uniformly reduced, a third gap portion 32 defined by the tapered area 27-1 and the recess 25 and a second gap portion 31 defined by the uniform areas 27-2, 28-2.

Thus, as shown in FIG. 9, by forming the third gap 32, the range of the uniform retract force can be increased, and hence a broader data area can be secured. FIG. 17 is a top view illustrating a fifth example of modification of the present invention.

Referring to FIG. 17, the same elements as those shown in FIGS. 2 through 5 are marked with the like symbols. In this example, two pieces of magnets 19-1, 19-2 are attached to the coil support member 11 of the actuator 6. Two sets of fixed yokes 20a, 20b are provided correspondingly thereto.

In this example, one fixed yoke 20a takes such a configuration as to lock the magnet 19-1. That is, one fixed yoke 20a has an area 20-2 providing a uniform gap width. Contrastingly, the other fixed yoke 20b assumes such a configuration as to retract the magnet 19-2. That is, the other fixed yoke 20b has only an area 20-1 in which the gap width is uniformly varied. In this example also, the lock position is the maximum torque position relative to the fixed yoke 20a. A functional separation is therefore attainable, and an influence by a tolerance of the parts is reduced.

Figure 19:
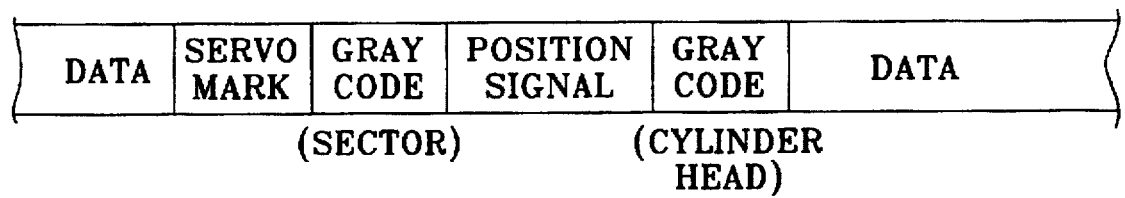
FIG. 19 is a diagram of assistance in explaining a sector servo system in FIG. 18.
Figure 20:
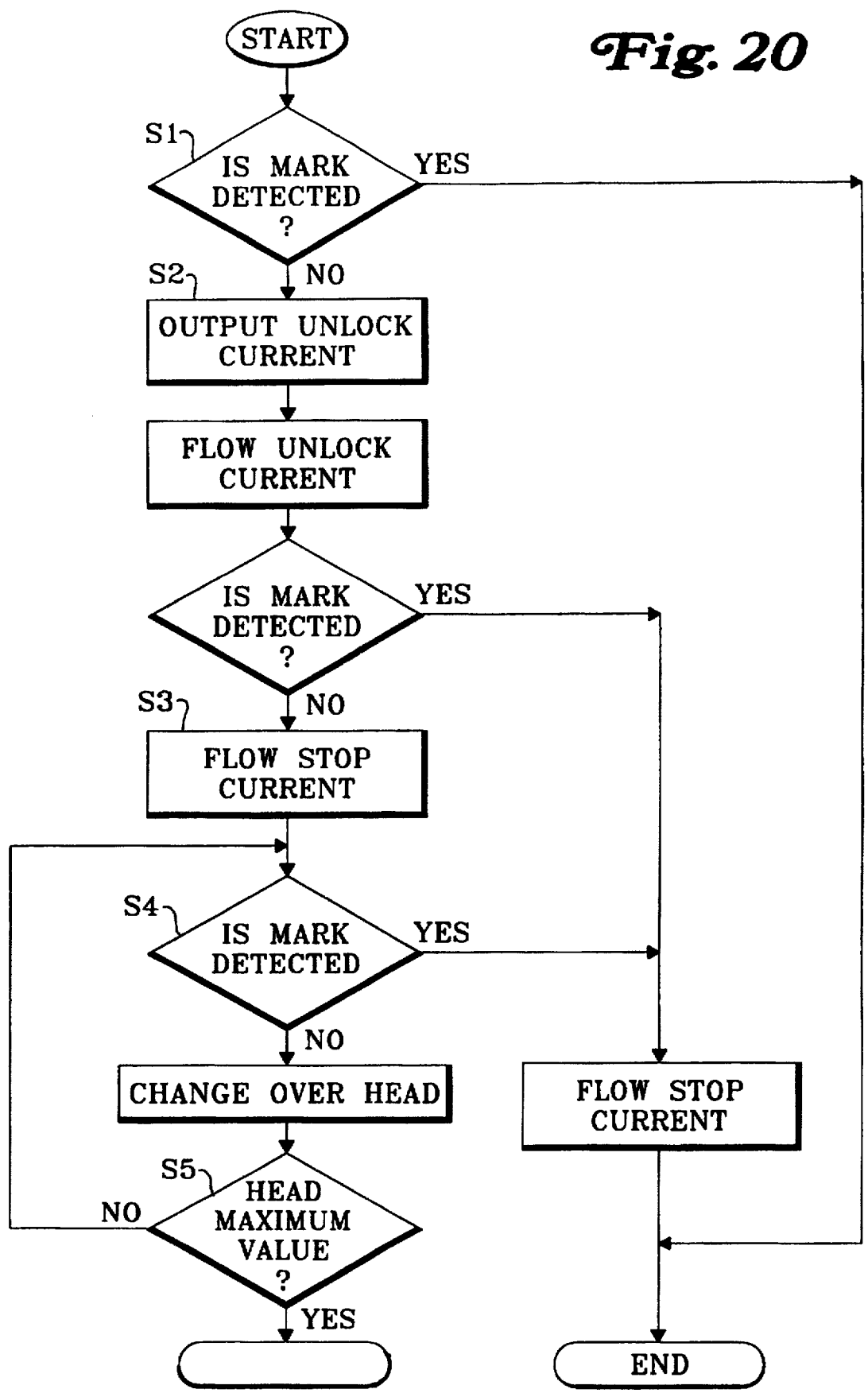
FIG. 20 is a flowchart showing unlock processing from a lock position in one embodiment of this invention.
Figure 21:
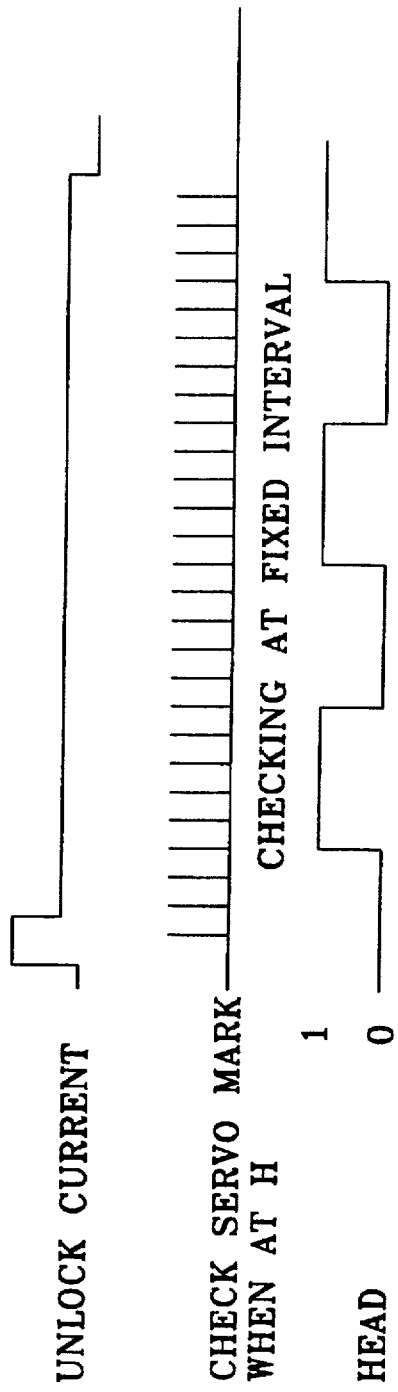
FIG. 21 is a explanatory diagram of the unlock operation in FIG. 20.

FIG. 18 is a block diagram illustrating one embodiment of the present invention. FIG. 19 is an explanatory diagram of servo control data of FIG. 18. FIG. 20 is a flowchart showing unlock processing in the construction of FIG. 18. FIG. 21 is an explanatory diagram of the unlock operation.

As illustrated in FIG. 18, a servo demodulator 61 demodulates a read signal read by the magnetic head 10 from the magnetic disk 4. Subsequently, the servo demodulator 61 outputs a servo mark detection signal, a position signal and some items of Gray code data (sector data, cylinder data and head data). A MCU (Micro-Controller Unit) 60 controls a VCM coil 12 and a spindle motor 5 on the basis of these items of data.

Control data on the magnetic disk 4 is conceived as sector servo data. Namely, as shown in FIG. 19, a servo mark, Gray codes, a position signal and control data of the Gray codes are recorded on a header of the data on each track.

A spindle motor control circuit 62 controls rotations of the spindle motor 5 under the control of the MCU 60. A VCM control circuit 63 drive-controls a VCM coil 12 under the control of the MCU 60.

By employing the above-mentioned retract/lock mechanisms (termed magnet catch mechanisms) 19–21, the retract force is generated even when the actuator 6 is in any position. For this reason, unlocking cannot be done by simply flowing the electric current. That is, the lock force is not necessarily constant depending on a mechanical manufacturing error. Considering this fact, it is necessary to control the unlocking.

In a sector servo system, a present position is confirmed by detecting a servo mark written on the track, and a seek operation can be started. Adopted herein is a method of confirming the unlocking because of detecting the servo mark by driving the actuator 6 while the present position remains unconfirmed.

An explanation will be given in conjunction with a flowchart of the unlocking process.

(S1): The MCU 60 checks whether or not a servo mark detection signal is generated at the start of the unlocking process. More specifically, this is a case where such a lock track as to lock the actuator is set to a track on which the sector servo data is written. In this case, when reading this item of data, the position can be known, and the unlocking process is not needed. Hence, the processing comes to an end without performing the unlocking process.

(S2): The MCU 60, when the servo mark can not be detected, outputs an unlock current by which the unlocking can be invariably done to the VCM control circuit 63. Then, the VCM control circuit 63 flows the unlock current across the VCM coil 12. The unlocking from the lock position is thereby performed. The unlock current at this time is required to be such an electric current that an unlock speed is a speed enough to detect the servo mark, and a maximum distance of a movement till the actuator is stopped is well shorter than a distance of the movable area. The MCU 60, as shown in FIG. 20, checks whether or not the servo mark detection signal is generated. If the servo mark detection signal is generated, the MCU 60, as shown in FIG. 20, outputs the electric current enough to stop the actuator 6 to the VCM control circuit 63, and the processing is finished. At this time, the retract force of the magnet catch mechanism works even after the end of the unlocking, and, therefore, the MCU 60 needs to flow an electric current to cancel the retract force.

(S3): The MCU 60, if the servo mark detection signal is not detected, outputs the electric current to stop the actuator to the VCM control circuit 63.

(S4): The MCU 60, as shown in FIG. 21, checks whether or not the servo mark detection signal is generated from the servo demodulator 61. If the servo mark detection signal is generated, the MCU 60, as shown in FIG. 20, outputs the electric current to stop the actuator 6 to the VCM control circuit 63, and the processing is ended. Herein, it can be considered that the electric current to assure the unlocking flows therein, and, nevertheless, the servo mark detection signal cannot be detected due to a trouble of the relevant track on the magnetic disk 4 or of a selected head. As shown in FIG. 21, the MCU 60 therefore changes over the reading head.

(S5): Then, the MCU 60 determines whether or not there is made a switchover to the maximum value of the head, i.e., to the final head. If not the final head, the processing returns to step (S4). Reversely, when reaching the final head, the processing is effected on the assumption that an abnormal state happens in the head or the actuator, and the processing comes to an end.

Thus, there flows the electric current to assure the unlocking from the magnet catch mechanism, and the unlocking can be therefore attained with the single unlocking action.

Figure 22:
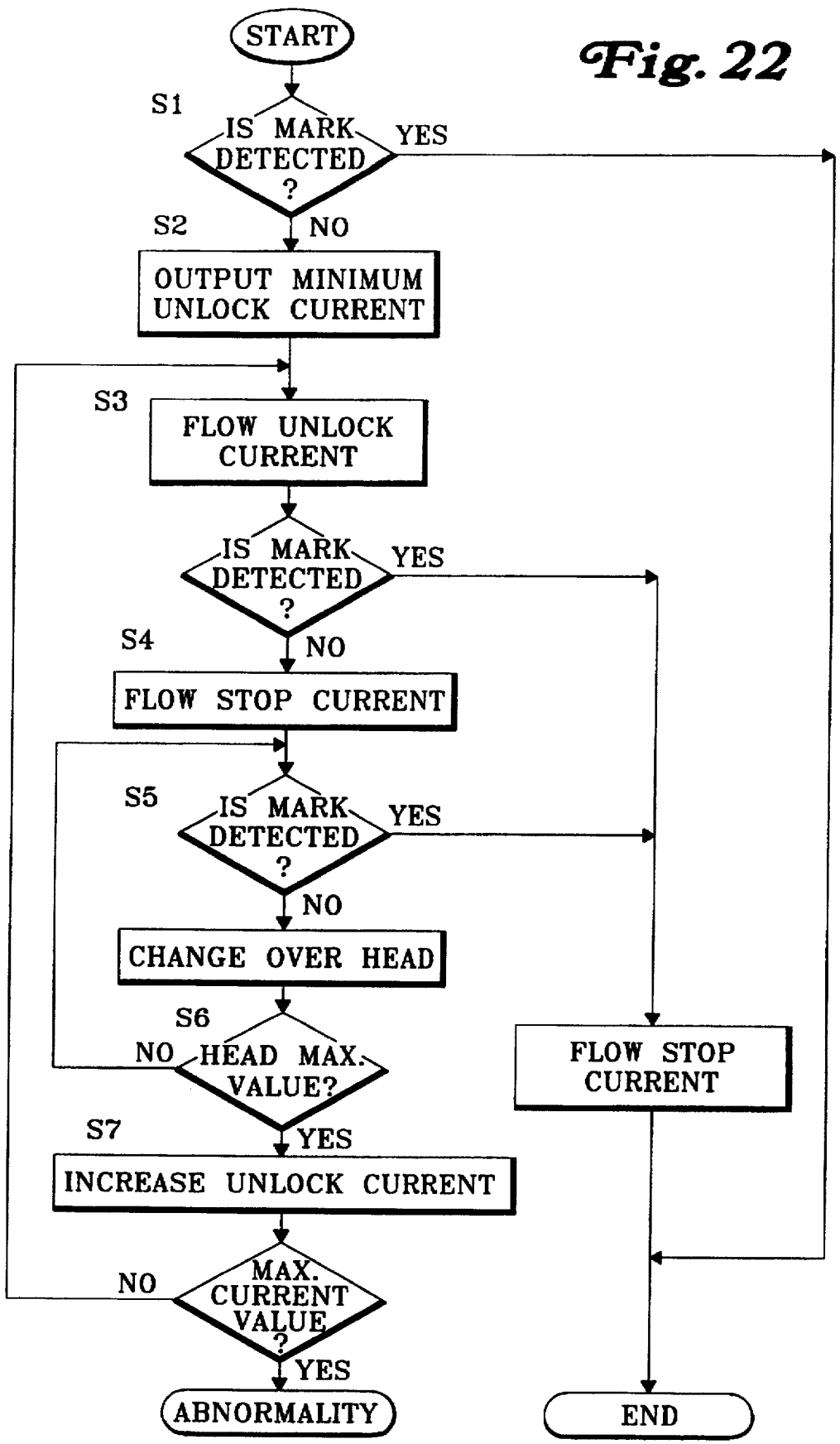
FIG. 22 is a flowchart showing unlock processing from the lock position in an example of modification of the present invention.
Figure 23:
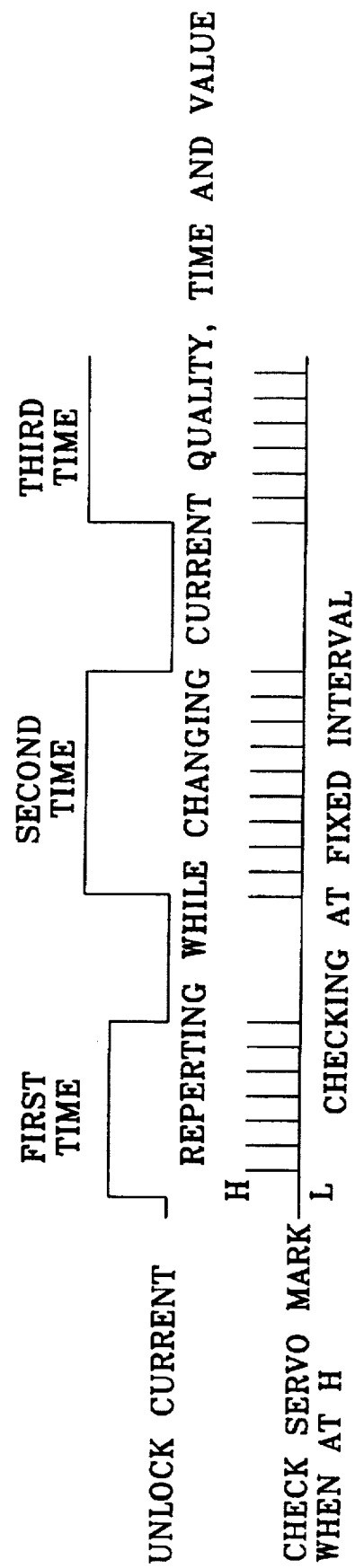
FIG. 23 is an explanatory diagram of the unlock operation in FIG. 22.

FIG. 22 is a flowchart showing another unlocking process. FIG. 23 is an explanatory diagram of another unlocking process.

(S1): The MCU 60 checks whether or not a servo mark detection signal is generated at the start of the unlocking process. More specifically, this is a case where such a lock track as to lock the actuator is set to a track on which the sector servo data is written. In this case, when reading this item of data, the position can be known, and the unlocking process is not needed. Hence, the processing comes to an end without performing the unlocking process.

(S2): The MCU 60, when the servo mark cannot be detected, outputs a minimum unlock current by which the unlocking can be done to the VCM control circuit 63. Then, the VCM control circuit 63 flows the unlock current across the VCM coil 12.

(S3): The MCU 60 checks whether or not the servo mark detection signal is generated from the servo demodulator 61 as shown in FIG. 23. If the servo mark detection signal is generated, the MCU 60, as shown in FIG. 22, outputs the electric current enough to stop the actuator 6 to the VCM control circuit 63, and the processing is finished. At this time, the retract force of the magnet catch mechanism works even after the end of the unlocking, and, therefore, the MCU 60 needs to flow an electric current to cancel the retract force.

(S4): The MCU 60, if the servo mark detection signal is not detected, outputs the electric current to stop the actuator to the VCM control circuit 63.

(S5): The MCU 60, as shown in FIG. 23, checks whether or not the servo mark detection signal is generated from the servo demodulator 61. If the servo mark detection signal is generated, the MCU 60, as shown in FIG. 22, outputs the electric current to stop the actuator 6 to the VCM control circuit 63, and the processing is ended. Herein, the fact that the unlock current flows therein and nevertheless the servo mark detection signal cannot be detected implies a trouble on the relevant track on the magnetic disk 4 or of a selected head. The MCU 60 therefore changes over the reading head.

(S6): Then, the MCU 60 determines whether or not there is made a switchover to the maximum value of the head, i.e., to the final head. If not the final head, the processing returns to step (S4).

(S7): Reversely, when reaching the final head, this implies a possibility of a lack of unlock current. The MCU 60 therefore slightly increases the unlock current and outputs the current to the VCM control circuit 63. Accordingly, the electric current flowing across the VCM coil 12 increases enough to make the unlocking easier. Then, the MCU 60 checks whether or not the set unlock current is not larger than the maximum current value. If the set unlock current does not exceed the maximum current value, the processing goes back to step (S3). Whereas if the set unlock current exceeds the maximum current value, this implies a possibility of causing an abnormal state in the head, the VCM or the like, and the processing is therefore ended.

In this way, the unlocking action is repeated several times till the unlocking is accomplished while incrementing the unlock current little by little. There can be reduced a possibility in which the actuator collides with the stopper disposed opposite to the lock position. A method of increasing this current may involve the use of a method of incrementing the current value by a fixed value, a method of increasing a current flow time and a method of increasing both of the current value and the current flow time as well. Further, for this reason, there may be prepared a current/time table adapted to an influence by the magnetic force of the magnet catch mechanism, and the current may be changed.

Also, when executing the unlocking from the magnet catch mechanism, a counter-electromotive force is measured, and a rotating speed of the spindle motor 5 is thus controlled. In such a case, it can be considered that the rotating speed fluctuates due to an error in detecting the counter-electromotive force. Therefore, the servo mark can be detected, but the cylinder data can not be demodulated by the Gray codes as the case may be.

For preventing this, after the unlocking from the magnet catch mechanism has been accomplished, the actuator is seek-controlled by only the position signals obtained from the servo signals, and the movement of the head is stopped. Next, the operation is switched over to the spindle motor control based on the servo mark signals, and the rotations of the spindle motor 5 are stabilized. Thereafter, the cylinder data is surely demodulated by the Gray codes, and the seek operation is conducted based on the cylinder data.

FIG. 24 is a block diagram illustrating the VCM control circuit of FIG. 18.

As shown in FIG. 24, a command current value from the MCU 60 is converted by a DA converter 64 into an analog quantity. An amplifier 631 of the VCM control circuit 63 adds this converted analog current value and an offset current value set by a variable resistance 630. Then, an output of the amplifier 631 is given to a driver 632 to drive the VCM coil 12.

The above retract/lock mechanisms 19 to 21 generate the retract forces all the time. Further, a reactive force of a flat cable for electrically connecting the actuator 6 to the outside is also an offset force. All these forces turn out to be offset forces, and the offset current needs to flow in order to cancel these offset forces. This offset current value is added to the command current value, and the VCM coil 12 is driven. However, the offset current value fluctuates due to a scatter in the apparatus. This offset current value is added to the command current value, and when the added value is inputted to the DA converter 64, a shift quantity of the DA converter 64 increases.

For preventing this, in accordance with this embodiment, the offset current value is measured for every apparatus and set in the dedicated offset cancel circuit (variable resistance) 630. As a result, only the command current value is inputted to the DA converter 64, and hence the shift quantity of the DA converter 64 can be reduced.

FIG. 25 is a block diagram showing another example of the VCM control circuit of FIG. 18.

As illustrated in FIG. 25, the magnetic disk drive incorporates a temperature sensor 65. A temperature detected by this temperature sensor 65 is converted into a digital value by an AD converter 632. A ROM 633 stores offset values corresponding to outputs of the AD converter 632. The offset value taken out of the ROM 633 is converted into an analog quantity by a DA converter 634 and inputted to an amplifier 631. The amplifier 631 adds the thus converted analog current value and the command current value of the DA converter 64. Then, an output of the amplifier 631 is given to the driver 632 to drive the VCM coil 12.

In accordance with this embodiment, the retract force by the above magnetic force and the reactive force of the flat cable change depending on the temperatures, and, hence, a change in the offset force due to the temperature is corrected. That is, the ROM 633 stores the offset current value per temperature, and the offset current value is varied corresponding to the temperature detected by the temperature sensor 65. In this example also, the shift quantity of the DA converter 64 can be reduced.

Figure 26:
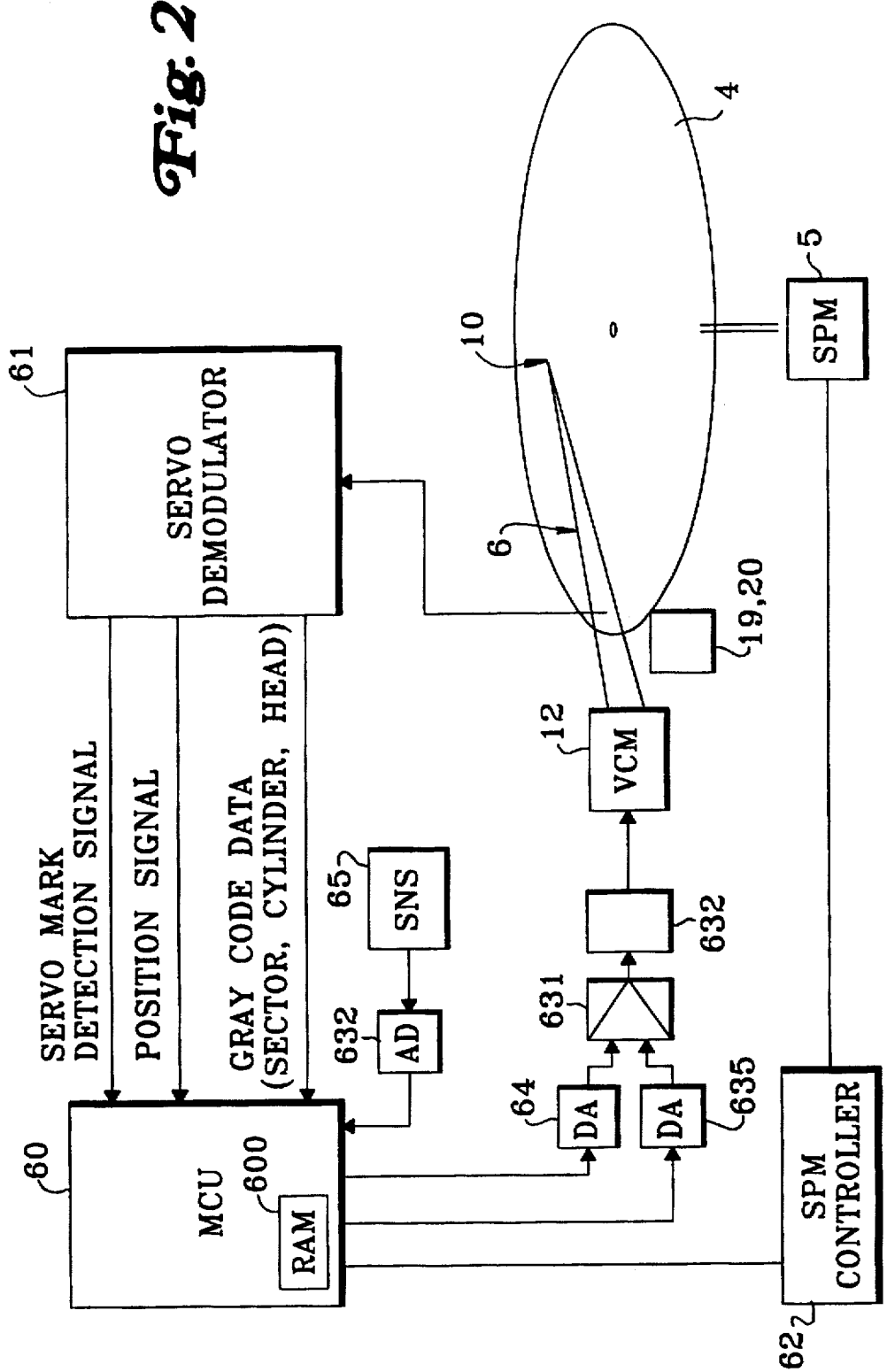
FIG. 26 is a block diagram showing an example of modification of an offset cancel circuit of this invention.

FIG. 26 is a block diagram showing an example of modification of the offset cancel circuit.

As depicted in FIG. 26, the MCU 60 incorporates a RAM 600. Then, an item of offset temperature correction data is written to the magnetic disk 4. This item of temperature correction data on the magnetic disk 4 is read to the RAM 600 of the MCU 60 after starting up the apparatus. In the magnetic disk drive, the temperature detected by the temperature sensor 65 is converted into a digital value by the AD converter 632 and inputted to the MCU 60. The MCU 60 takes the temperature correction data corresponding to this detected temperature out of the RAM 600, and an offset current value of that temperature is calculated. This calculated offset current value is converted into an analog quantity by the DA converter 635 and inputted to the amplifier 631. The amplifier 631 adds this converted analog current value and the command current value of the DA converter 64. Subsequently, an output of the amplifier 631 is supplied to the driver 632 to drive the VCM coil 12.

In accordance with this embodiment, the magnetic disk is stored with the correction data, and therefore a special memory is not needed. For this reason, the temperature correction of the offset value can be done with a simple construction. Further, in this example also, the shift quantity of the DA converter 64 can be reduced.

Figure 27:
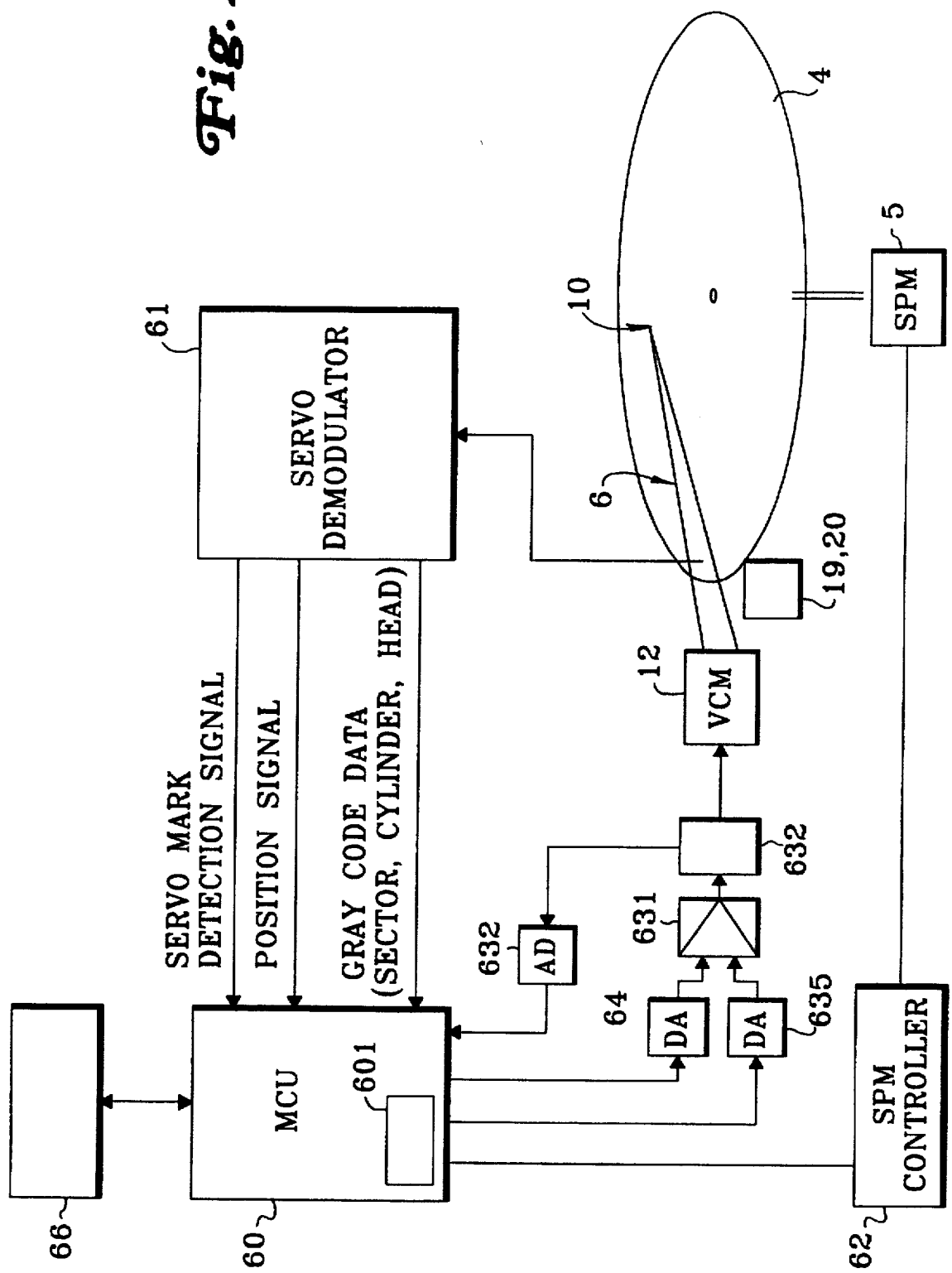
FIG. 27 is a block diagram showing another example of modification of the offset cancel circuit of this invention.
Figure 29A:
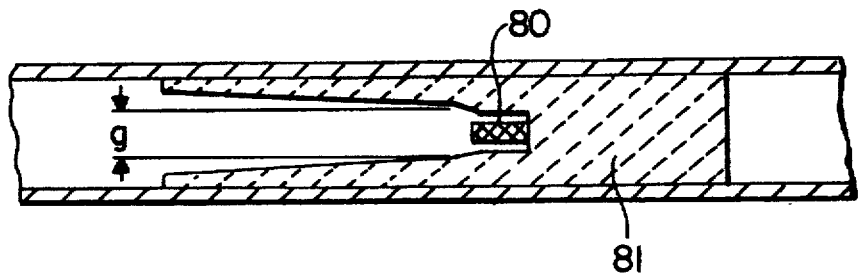
FIGS. 29A and 29B are explanatory diagrams showing the prior art.
Figure 29B:
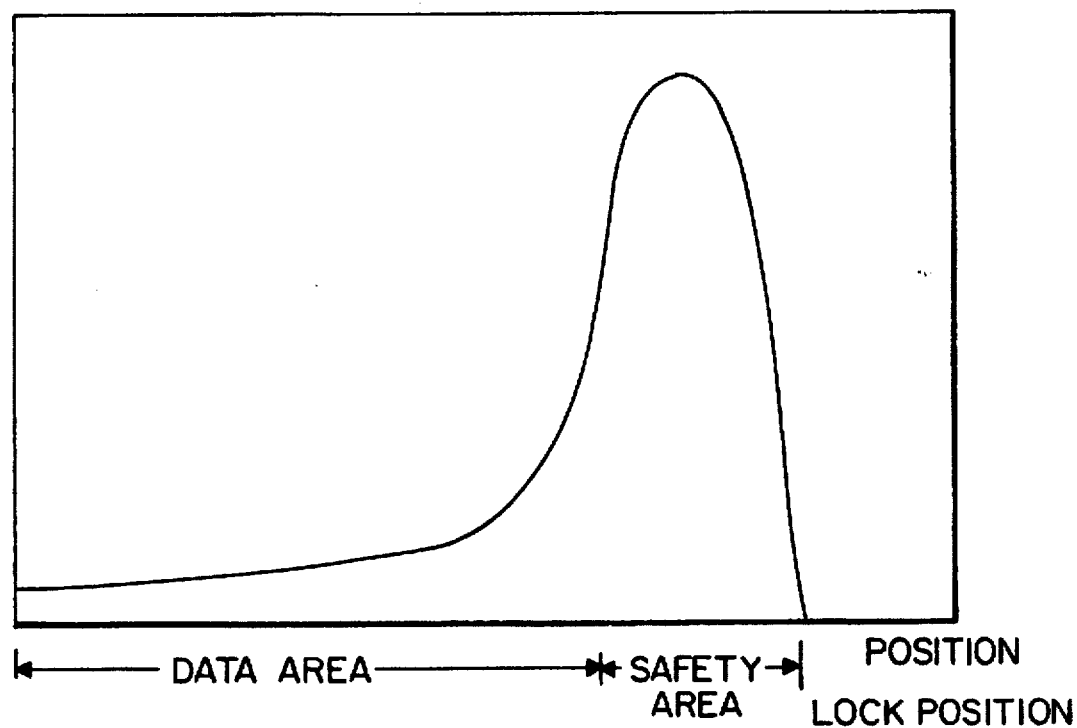

FIG. 27 is a block diagram illustrating another example of modification of the offset cancel circuit. FIG. 28 is an explanatory diagram of its operation.

In this embodiment, some consideration is given to a difference between the offset values in respective positions of the actuator 6. Then, this difference is to be corrected. Therefore, an output value of the DA converter 635 and a current value of the driver 632 in each position are measured by calibration. Subsequently, an error thereof is obtained, and the offset current value is corrected corresponding to such a difference.

As shown in FIG. 27, the output current value of the driver 632 is read to the MCU 60 by the AD converter 632. The MCU 60 operates a calibration function, and the table (see FIG. 28) for storing the data about respective set points 1 through 4 is secured in the memory 66. The MCU 60 sets the data in the DA converter 63;, and this item of set data is stored in A of the table of the memory 66.

The MCU 60 causes the AD converter 632 to read a current value (value of current flowing across the VCM coil 12) of the driver 632 in relation to this item of data, and the current value is measured. This measured value is stored in A1 of the table of the memory 66. The MCU 60 measures the data corresponding to the set point D. The table shown in FIG. 28 is thereby completed.

Next, the MCU 60 creates pseudo straight lines of A to D and pseudo straight lines of A1 to D1 of the table of the memory 66. Subsequently, the MCU 60 causes the memory 66 to store differences between the pseudo straight lines of A to D and the pseudo straight lines of A1 to D1 in the set points A2 through D2 of its table. Further, the MCU 60 adds the difference data A2–D2 of the set points which correspond the respective positions to an initial set value ([80] in the Figure) of a register 601 and calculates the added values. The calculated values are stored as output values of the DA converter into the table. Then, the MCU 60 outputs the above value as an offset current value corresponding to that position to the DA converter 635.

This calculated offset current value is converted into an analog quantity by the DA converter 635 and inputted to the amplifier 631. The amplifier 631 adds this converted analog current value and the command current value of the DA converter 64. Then, an output of the amplifier 631 is supplied to the driver 632 to drive the VCM coil 12.

In this manner, the offset current value corresponding to the position of the actuator is allowed to flow. In this example also, the shift quantity of the DA converter 64 can be reduced.

According to the present invention, the following modifications other than the above-discussed embodiments can be carried out.

First, in the embodiment of FIG. 6A, the upper yoke may be constructed of a flat yoke, e.g., the yoke 14 of the main magnetic circuit. Second, in the embodiment of FIG. 6A, the invention is applicable to a construction eliminating the third areas 20-3, 21-3.

The present invention has been described so far by way of the embodiments. However, a variety of modifications may be carried out within the scope of the gist of the present invention but are not excluded from the scope of the present invention.

As discussed above, according to this invention, there is provided the stopper member 15 for setting the stop position of the rotary actuator 6 in such a position that the torque by the fixed yoke members 20, 21 and the magnet 19 is maximized. The magnet 19 is thereby locked in the maximum torque position. For this reason, the force of torque is effectively availed, and hence the force for holding the lock position is strengthened against the impact and vibrations from the outside.

Provided further are one pair of upper and lower fixed yoke members 20, 21 that are mechanically separated. Accordingly, the loop-of-flux force of the upper and lower yoke members 20, 21 weakens. Therefore, the force of torque in the data area is uniformized, and the offset control during the seek can be facilitated.

Moreover, the fixed yoke members 20, 21 are provided between the second area 20-2 and the first area 20-1. Formed also is the third area 20-3 having the gap width larger than the gap width of the second area 20-2. It is therefore possible to flatten the torque curve. The force of torque in the whole data area can be uniformized.

What is claimed is:

1. A magnetic disk drive comprising:
    at least a single piece of magnetic disk;
    a rotary mechanism for rotating said magnetic disk;
    a rotary actuator rotating about a shaft;
    a coil, provided at one end of said rotary actuator, for rotating said rotary actuator;
    a magnetic head attached to the other end of said rotary actuator;
    a yoke of a main magnetic circuit for giving a driving force for driving said coil;
    at least one magnet provided on said rotary actuator;
    a pair of fixed yoke members forming a magnetic circuit for said magnet in all or a part of a movable range of said rotary actuator and including a first end at one limit of said movable range and a second end at the other limit of said movable range, said first and second ends being separated from each other via an air gap; and
    a stopper member for setting a rotation stop position of said rotary actuator at a position so that torque produced by said fixed yoke members and said magnet is maximized, wherein said rotary actuator has one side that is provided with said magnet and another side, that is not provided with said magnet, for defining said rotation stop position by colliding with said stopper member.

2. The magnetic disk drive according to claim 1, wherein said stopper member is constructed of a side yoke of said yoke of the main magnetic circuit.

3. The magnetic disk drive according to claim 1, wherein said pair of fixed yoke members include:
    a first area, having a gap width uniformly reduced in a lock direction of said rotary actuator, for generating a retract force of said rotary actuator; and
    a second area, having a gap width smaller than a gap width of the first area, for generating a lock force of said rotary actuator,
    said one pair of fixed yoke members being mechanically separated from each other via said air gap.

4. The magnetic disk drive according to claim 3, wherein said one pair of fixed yoke members are provided between said first area and said second area and include a third area having a gap width larger than said gap width of said second area and having a configuration to restrain an influence of a torque of said second area.

5. The magnetic disk drive according to claim 4, wherein said magnet has a magnetizing direction opposite to a magnetizing direction of the main magnetic circuit.

6. The magnetic disk drive according to claim 4, wherein an area of a surface orthogonal to the magnetizing direction of said magnet falls within a range of 10%–20% with respect to an allowable rotary angle of said rotary actuator.

7. The magnetic disk drive according to claim 3, further comprising means for supplying said coil of said rotary actuator with an electric current for canceling a retract force acting toward the stop position.

8. The magnetic disk drive according to claim 3, wherein said magnet has a magnetizing direction opposite to a magnetizing direction of the main magnetic circuit.

9. The magnetic disk drive according to claim 3, wherein an area of a surface orthogonal to the magnetizing direction of said magnet falls within a range of 10%–20% with respect to an allowable rotary angle of said rotary actuator.

10. The magnetic disk drive according to claim 1, further comprising:
    a second magnet attached to said rotary actuator; and
    a second fixed yoke member provided corresponding to said second magnet, forming a magnetic circuit in a movable range of said rotary actuator and formed with a gap having a gap width uniformly reduced.

11. The magnetic disk drive according to claim 1, wherein said magnet has a magnetizing direction opposite to a magnetizing direction of the main magnetic circuit.

12. The magnetic disk drive according to claim 1, wherein an area of a surface orthogonal to the magnetizing direction of said magnet falls within a range of 10%–20% with respect to an allowable rotary angle of said rotary actuator.

13. The magnetic disk drive according to claim 1, wherein said fixed yoke members are constructed of a yoke of the main magnetic circuit and a fixed yoke member provided under said yoke of the main magnetic circuit.

14. The magnetic disk drive according to claim 1, further comprising means for supplying said coil of said rotary actuator with an unlock current for effecting the unlocking in the stop position.

15. The magnetic disk drive according to claim 14, wherein said means for supplying the unlock current detect that said magnetic head reads a servo pattern in servo data written to said magnetic disk and stop the supply of the unlock current by detecting the servo pattern.

16. The magnetic disk drive according to claim 1, wherein said one pair of fixed yoke members include:
an area having a lock gap for generating a lock force of said rotary actuator.

17. The magnetic disk drive according to claim 16, wherein approximately 30% to 50% of said magnet enters in the lock gap.

18. A magnetic disk drive comprising:
at least a single piece of magnetic disk;
a rotary mechanism for rotating said magnetic disk;
a rotary actuator rotating about a shaft;
a coil, provided at one end of said rotary actuator, for rotating said rotary actuator;
a magnetic head attached to the other end of said rotary actuator;
a yoke of a main magnetic circuit for giving a driving force for driving said coil;
at least one magnet provided on said rotary actuator; and
one pair of fixed yoke members forming a magnetic circuit for said magnet in all or a part of a movable range of said rotary actuator and including a first area having a gap width uniformly reduced in a lock direction to retract said rotary actuator and a second area having a gap width smaller than said gap width of said first area to lock said rotary actuator, said one pair of fixed yoke members further including a first end at one limit of said movable range and a second end at the other limit of said movable range, said first and second ends being separated from each other via an air gap whereby torque produced by said fixed yoke members and said magnet is maximized at said second area.

19. The magnetic disk drive according to claim 18, wherein said one pair of fixed yoke members are provided, between said first area and said second area with a third area having a gap width larger than said gap width of said second area, and having a configuration to restrain an influence of a torque of said second area.

20. The magnetic disk drive according to claim 19, wherein said magnet has a magnetizing direction opposite to a magnetizing direction of the main magnetic circuit.

21. The magnetic disk drive according to claim 19, wherein an area of a surface orthogonal to the magnetizing direction of said magnet falls within a range of 10%–20% with respect to an allowable rotary angle of said rotary actuator.

22. The magnetic disk drive according to claim 19, wherein said one pair of fixed yoke members are constructed of said yoke of the main magnetic circuit and a fixed yoke member provided under said yoke of the main magnetic circuit.

23. The magnetic disk drive according to claim 18, wherein said magnet has a magnetizing direction opposite to a magnetizing direction of the main magnetic circuit.

24. The magnetic disk drive according to claim 18, wherein an area of a surface orthogonal to the magnetizing direction of said magnet falls within a range of 10%–20% with respect to an allowable rotary angle of said rotary actuator.

25. The magnetic disk drive according to claim 18, wherein said one pair of fixed yoke members are constructed of said yoke of the main magnetic circuit and a fixed yoke member provided under said yoke of the main magnetic circuit.

26. The magnetic disk drive according to claim 18, further comprising means for supplying said coil of said rotary actuator with an unlock current for effecting the unlocking of said rotary actuator.

27. The magnetic disk drive according to claim 26, wherein said means for supplying the unlock current detect that said magnetic head reads a servo pattern in servo data written to said magnetic disk and stop the supply of the unlock current by detecting the servo pattern.

28. The magnetic disk drive according to claim 27, wherein said means for supplying the unlock current stops the supply of the unlock current by detecting the servo pattern and, at the same time, supplies an offset current for canceling the retract force.

29. The magnetic disk drive according to claim 18, further comprising means for supplying said coil of said rotary actuator with an electric current for canceling a retract force.

30. A magnetic disk drive comprising:
at least a single piece of magnetic disk;
a rotary mechanism for rotating said magnetic disk;
a rotary actuator rotating about a shaft;
a coil, provided at one end of said rotary actuator, for rotating said rotary actuator;
a magnetic head attached to the other end of said rotary actuator;
a yoke of a main magnetic circuit for giving a driving force for driving said coil;
at least one magnet provided on said rotary actuator; and
a fixed yoke member forming a magnetic circuit for said magnet in a movable range of said rotary actuator and including a second area having a minimum gap width to lock said rotary actuator, a first area having a gap width that becomes smaller as it approaches said second area to retract said rotary actuator, and a third area, formed between said second area and said first area, having a gap width larger than said minimum gap width of said second area and wherein the third area has a smaller slope than said first area to slow retraction of said rotary actuator and a configuration, to restrain an influence of a torque of said second area whereby torque produced by said fixed yoke member and said magnet is maximized at said second area through a geometric center of said magnet.

31. The magnetic disk drive according to claim 30, wherein said magnet has a magnetizing direction opposite to a magnetizing direction of the main magnetic circuit.

32. The magnetic disk drive according to claim 30, wherein an area of a surface orthogonal to the magnetizing direction of said magnet falls within a range of 10%–20% with respect to an allowable rotary angle of said rotary actuator.

33. The magnetic disk drive according to claim 30, wherein said fixed yoke member is constructed of a yoke of the main magnetic circuit and a fixed yoke member provided under said yoke of the main magnetic circuit.

34. The magnetic disk drive according to claim 30, further comprising means for supplying said coil of said rotary actuator with an unlock current for effecting the unlocking of said rotary actuator.

35. The magnetic disk drive according to claim 34, wherein said means for supplying the unlock current detect that said magnetic head reads a servo pattern in servo data written to said magnetic disk and stop the supply of the unlock current by detecting the servo pattern.

36. The magnetic disk drive according to claim 35, wherein said means for supplying the unlock current stops the supply of the unlock current by detecting the servo pattern and, at the same time, supplies an offset current for canceling the retract force.

37. The magnetic disk drive according to claim 30, further comprising means for supplying said coil of said rotary actuator with an electric current for canceling the retract force.

* * * * *